US009528614B2

(12) United States Patent
Geiser et al.

(10) Patent No.: US 9,528,614 B2
(45) Date of Patent: Dec. 27, 2016

(54) VACUUM VALVE AND CLOSURE MEMBER FOR CLOSING A FLOW PATH IN A GAS-TIGHT MANNER BY MEANS OF A LINEAR MOVEMENT

(75) Inventors: Friedrich Geiser, Nüziders (AT); Anton Neumeir, Mering (DE); Berhard Duelli, Übersaxen (AT); Thomas Blecha, Feldkirch (AT); Karlheinz Summer, Bludenz (AT)

(73) Assignee: VAT HOLDING AG, Haag (CH)

( * ) Notice: Subject to any disclaimer, the term of this patent is extended or adjusted under 35 U.S.C. 154(b) by 25 days.

(21) Appl. No.: 14/235,409

(22) PCT Filed: Jul. 11, 2012

(86) PCT No.: PCT/EP2012/063580
§ 371 (c)(1),
(2), (4) Date: Jan. 27, 2014

(87) PCT Pub. No.: WO2013/013981
PCT Pub. Date: Jan. 31, 2013

(65) Prior Publication Data
US 2014/0158924 A1   Jun. 12, 2014

(30) Foreign Application Priority Data
Jul. 28, 2011   (EP) .................... 11175737

(51) Int. Cl.
*F16K 3/30* (2006.01)
*F16K 3/18* (2006.01)
(Continued)

(52) U.S. Cl.
CPC .............. *F16K 3/30* (2013.01); *F16K 3/314* (2013.01); *F16K 51/02* (2013.01); *F16K 3/18* (2013.01)

(58) Field of Classification Search
CPC ............ F16K 3/30; F16K 51/02; F16K 3/314; F16K 3/02; F16K 3/0218; F16K 3/029; F16K 3/10; F16K 3/12; F16K 3/14; F16K 3/16; F16K 3/18; F16K 3/20; F16K 3/184; F16K 3/186
(Continued)

(56) References Cited

U.S. PATENT DOCUMENTS 4,809,950 A   3/1989   Geiser
4,881,717 A   11/1989  Geiser
(Continued)

FOREIGN PATENT DOCUMENTS

CN   201100470 Y   8/2008
CN   101276729 B   6/2010
(Continued)

*Primary Examiner* — Michael R Reid
(74) *Attorney, Agent, or Firm* — Maschoff Brennan

(57) ABSTRACT

A vacuum valve closes a flow path in a gas-tight manner using a linear movement and includes a closure member, a first sealing surface of the valve housing that encloses the opening, and a corresponding second sealing surface of the closure member. In the closed position, the second sealing surface is in sealing contact with the first sealing surface. In the region between the opening and the first sealing surface, the valve housing includes a first sloped surface that encloses the opening, and the closure member includes a corresponding, parallel second sloped surface. The sloped surfaces, which have a sloping angle between 3 and 15 degrees relative to the geometric adjustment axis, are located such that, in the closed position of the closure member, the second sloped surface is arranged in a parallel position opposite the first sloped surface at a distance of 0 and 0.6 mm.

20 Claims, 17 Drawing Sheets

(51) Int. Cl.
*F16K 51/02* (2006.01)
*F16K 3/314* (2006.01)

(58) Field of Classification Search
USPC ............... 251/328, 326, 327, 329, 333, 332, 334, 251/170, 172, 193–197, 199, 201–204, 359
See application file for complete search history.

(56) References Cited

U.S. PATENT DOCUMENTS

| | | | |
|---|---|---|---|
| 4,921,213 A | | 5/1990 | Geiser |
| 5,271,602 A | * | 12/1993 | Funaba ..................... 251/335.3 |
| 6,056,266 A | | 5/2000 | Blecha |
| 6,089,537 A | | 7/2000 | Olmsted |
| 6,416,037 B1 | | 7/2002 | Geiser |
| 6,629,682 B2 | | 10/2003 | Duelli |
| 6,685,163 B2 | | 2/2004 | Blecha |
| 6,837,483 B2 | * | 1/2005 | Wu ............................... 251/328 |
| 7,134,642 B2 | | 11/2006 | Seitz |
| 7,766,305 B2 | | 8/2010 | Kim |
| 7,806,383 B2 | | 10/2010 | Tran et al. |
| 7,828,267 B2 | | 11/2010 | Iwabuchi |
| 2008/0017823 A1 | * | 1/2008 | Litscher ....................... 251/193 |
| 2008/0053957 A1 | | 3/2008 | Wakabayashi |
| 2012/0055400 A1 | * | 3/2012 | Hiroki ....................... F16K 1/24 118/620 |

FOREIGN PATENT DOCUMENTS

| | | | | |
|---|---|---|---|---|
| CN | 101208551 B | | 4/2011 | |
| CN | 101314867 B | | 7/2012 | |
| JP | 06-241344 A | | 8/1994 | |
| JP | 2003-269655 A | | 9/2003 | |
| JP | WO 2010113891 A1 | * | 10/2010 | ............... F16K 1/24 |
| WO | 2012/022565 A1 | | 2/2012 | |
| WO | 2012/126704 A1 | | 9/2012 | |

* cited by examiner

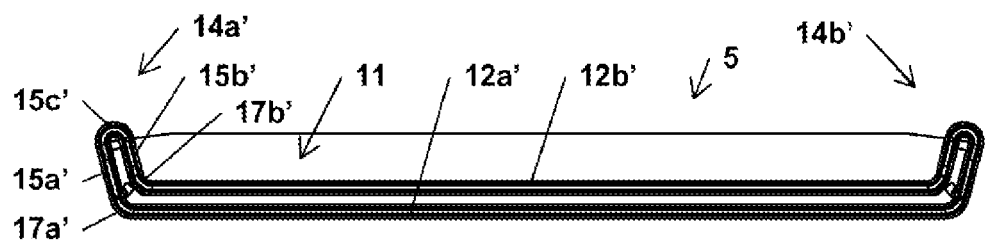
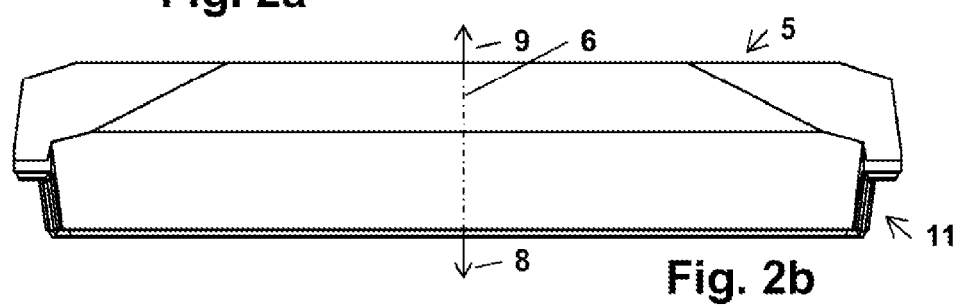
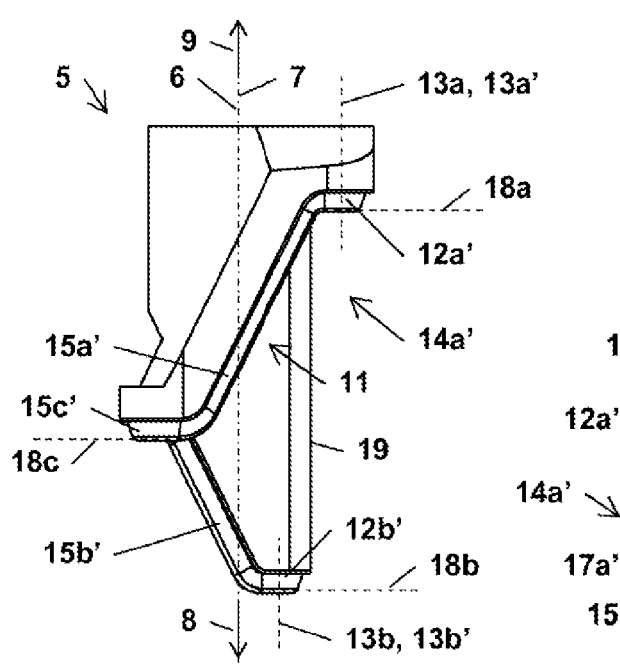
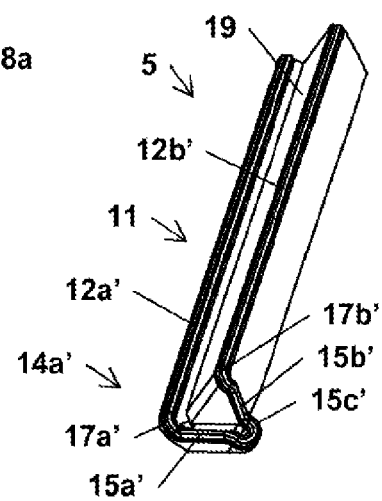
Fig. 2a
Fig. 2b
Fig. 2c
Fig. 2d

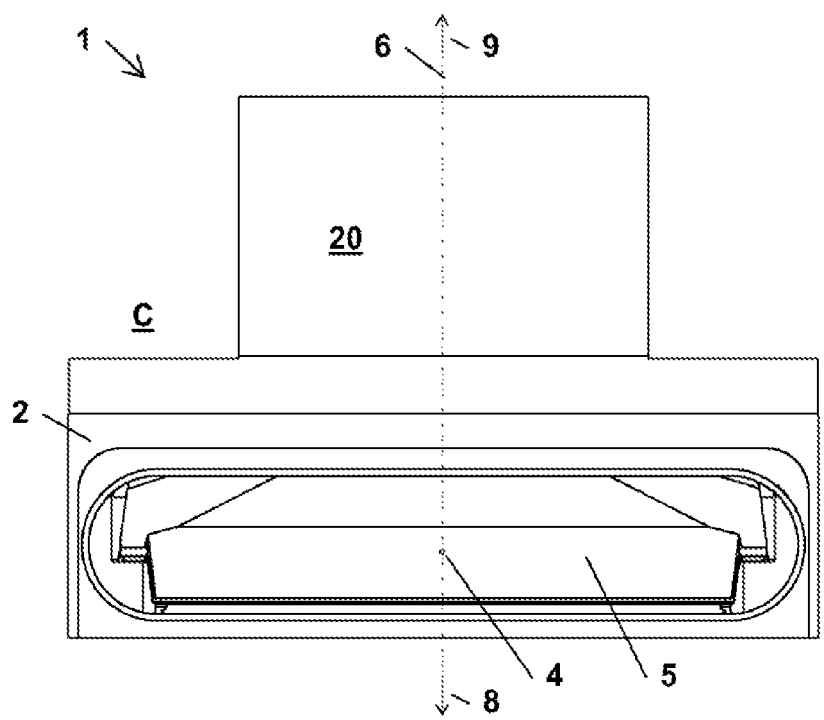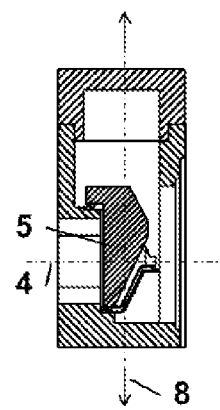
Fig. 3a      Fig. 3b
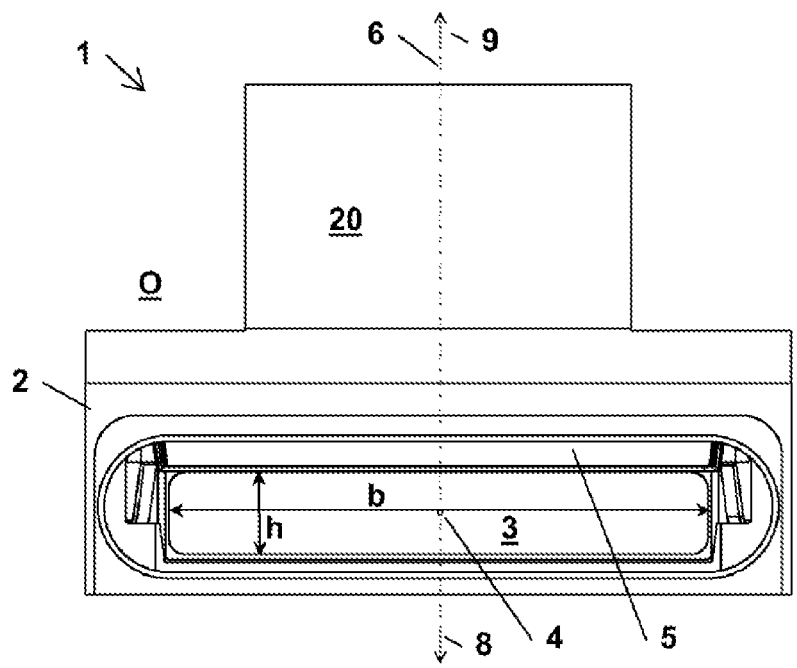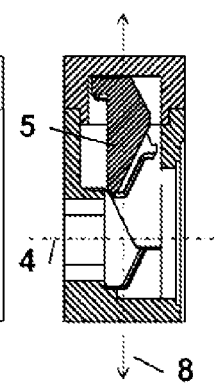
Fig. 3c      Fig. 3d

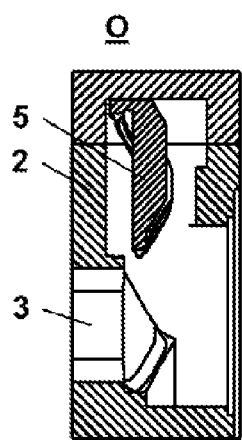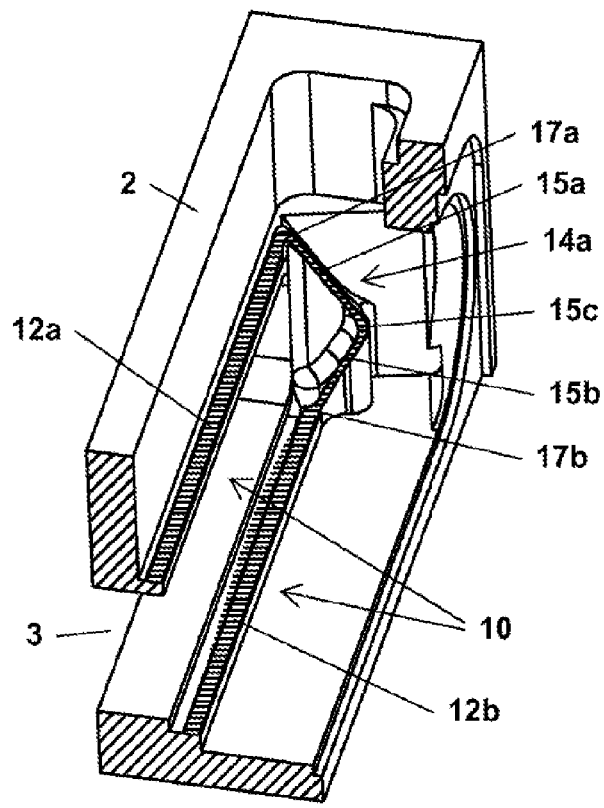
Fig. 4a                    Fig. 4b

VACUUM VALVE AND CLOSURE MEMBER FOR CLOSING A FLOW PATH IN A GAS-TIGHT MANNER BY MEANS OF A LINEAR MOVEMENT

FIELD OF THE INVENTION

The invention relates to a vacuum valve for closing a flow path in a gas-tight manner by means of a linear movement and to a corresponding closure member.

BACKGROUND

Vacuum valves as claimed in the preamble of claim 1 and closure members as claimed in the preamble of claim 11 are known in particular in the form of the transfer valve developed as a rectangular insert valve with the product name "MONOVAT Series 02 and 03" by VAT Vakuumventile AG in Haag, Switzerland. The design and method of operation of such a valve are described in a schematic manner, for example, in U.S. Pat. No. 4,809,950 (Geiser) and U.S. Pat. No. 4,881,717 (Geiser).

In general, vacuum valves for closing in a substantially gas-tight manner a flow path which leads through an opening realized in a valve housing are known in various embodiments from the prior art. Vacuum gate valves are used in particular in the area of integrated circuit and semiconductor production which has to take place in a protected atmosphere, where possible without the presence of contaminated particles. For example, in a manufacturing plant for semiconductor wafers or liquid crystal substrates, the highly sensitive semiconductor or liquid crystal elements sequentially run through several process chambers in which the semiconductor elements, located inside the process chamber, are processed in each case by means of a processing device. Both during the processing process inside the process chamber and during the conveying from process chamber to process chamber, the highly sensitive semiconductor elements must always be situated in a protected atmosphere—in particular in a vacuum. The process chambers are connected together, for example, by passageways, it being possible to open the process chambers by means of vacuum gate valves for transferring the parts from the one process chamber to the next process chamber and to close them subsequently in a gas-tight manner to carry out the respective process stage. These types of valves are also called vacuum transfer valves as a result of the described field of application and also as rectangular gate valves as a result of their rectangular opening cross section.

As transfer valves are used, among other things, during the manufacture of highly-sensitive semiconductor elements, the generation of particles brought about in particular by the actuation of the valve and the number of free particles in the valve chamber have to be kept as low as possible. Particle generation is primarily a consequence of friction, for example as a result of metal-metal contact and as a result of abrasion.

The demands made on the seals that are used with vacuum valves are very high. On the one hand, the tightness of the valve has to be ensured in the closed state of the valve. This is a big challenge above all as a result of the high differential pressures in the vacuum region and the consequently occurring large forces which act on the valve closure. As in the case of excessively large amounts of pressing, the seals used are subject to an above-averagely high level of wear or are destroyed, the design of the valve must be such that the differential pressing forces are not able to act on the seals or can only act on them in a limited manner. In addition, transverse loads and longitudinal loads on the seal are to be kept as small as possible. Above all, in the case of transverse loads transversely with respect to the longitudinal direction of the seal, with O-ring seals there is the risk that they are torn out of their holder, in particular the groove in which they are fixed. Even vulcanized seals may only be exposed to very limited transverse forces. Both in the open and the closed state of the valve, the seals are exposed in part to aggressive media and consequently have to be either created in such a manner that they are able to withstand the influences, and/or that they are moved out of the flow path of the medium, also to avoid abrasion. An excessively high amount of wear on the seal represents an uncertainty factor for process reliability and requires the seal to be regularly replaced, which in turn leads to increased down times in the process.

Various embodiments of vacuum valves, in particular the seal and drive technologies thereof, are known from the prior art and, among other things, the aim thereof is to increase the service life of the seals used as well as to improve process reliability.

Depending on the respective drive technologies, a difference is made in particular between gate valves, also called valve gates or rectangular gates, and shuttle valves, the closing and opening in the prior art being effected in the majority of cases in two stages. In a first stage, a valve closure member, in particular a closure actuator, in the event of a gate valve such as, for example, known from U.S. Pat. No. 6,416,037 (Geiser) or U.S. Pat. No. 6,056,266 (Blecha), in particular of the L-type, is displaced linearly over an opening substantially parallel to the valve seat or in the event of a shuttle valve such as, for example, known from U.S. Pat. No. 6,089,537 (Olmsted), is pivoted about a pivot axis over the opening without at the same time any contact between the closure actuator and the valve seat of the valve housing taking place. In a second stage, the closure actuator is pressed onto the valve seat of the valve housing by way of the closure side thereof such that the opening is closed in a gas-tight manner. The sealing can be effected, for example, either by means of a seal which is arranged on the closure side of the closure actuator and is pressed onto the valve seat which runs around the opening, or by means of a sealing ring on the valve seat, against which the closure side of the closure actuator is pressed. The seal, in particular the sealing ring, can be held and/or vulcanized in a groove.

Various seal devices are known from the prior art, for example from U.S. Pat. No. 6,629,682 B2 (Duelli). A suitable material for sealing rings is, for example, the elastic sealing material known under the trade name of Viton®.

Along with the possibility of controlling the through flow in a precise manner, the advantage above all of the described two-stage movement, where the closure member is first of all pushed transversely over the opening without the seal contacting the valve seat, and the closure member is subsequently pressed substantially vertically onto the valve seat, is that the seal is pressed almost exclusively vertically without the seal being loaded transversely or longitudinally. However, the relatively complex design of the drive, which is formed in particular either by one single drive which enables an L-shaped movement of the closure member, or by a plurality of drives, for example, two linear drives or one linear and one expanding drive, is disadvantageous. Expanding drives, which are arranged in the majority of cases directly behind the closure actuator and adjust said closure actuator in relation to the shaft on which they are situated in the vertical direction onto the valve seat, also have the disadvantage that a multitude of mechanical parts which carry out relative movements with respect to one another are arranged in the valve interior. This increases the complexity of the design, on the one hand, and the generation of friction particles which are harmful to the process, on the other hand. A further disadvantage of the multi-stage movement is the limited adjustment speed of the closure member between the fully open state and the fully closed state. Wedge valves, which are adjusted purely in a linear manner, certainly enable a high adjustment speed, but as a result of the transverse load on the seal are only suitable in a limited manner for use as a main seal in the vacuum region, and if at all, then only for a few adjustment cycles.

Said problem is solved by means of gate valves where the closing and sealing operation is certainly effected by means of one single linear movement, but the seal geometry is in such a manner that a transverse load on the seal is completely avoided. Such a valve is, for example, the transfer valve produced by VAT Vakuumventile AG in Haag, Switzerland which is known under the product name "MONOVAT Series 02 and 03" and is developed as a rectangular insert valve. The design and method of operation of such a valve are described, for example, in U.S. Pat. No. 4,809,950 (Geiser) and U.S. Pat. No. 4,881,717 (Geiser).

The valve described there has in its housing a sealing face which, when viewed in the direction of the axis of the valve passage opening, has portions which are located one behind another and merge by means of constantly extending curvatures into flat sealing face portions which extend laterally outward, the imaginary generatrices of said one-part sealing face which has, however, several portions, lying parallel to the axis of the valve passage opening. The sealing face is machined. The closure member has a supporting face which corresponds thereto for the circumferentially closed seal. Described in more detail, the so-called valve gate has a gate housing and a gate passage opening which is closable by way of a closure member which is displaceable in its plane. In the region of the gate passage opening, there is provided a sealing face against which, in the closed position of the closure member, a circumferentially closed seal, which is arranged thereon, abuts, the imaginary, straight generatrices of the sealing face lying parallel to the axis of the gate passage opening. The circumferentially closed, one-piece seal has portions of various lengths and/or forms which lie in different planes, two main portions of the circumferentially closed seal lying in planes which are at right angles to the axis of the gate passage opening and are spaced apart from one another. The two main portions of the seal are connected by side portions. For the development of the sealing face of the housing, the closure member has a face which extends in a corresponding manner and bears the circumferentially closed seal. The side portions of the circumferentially closed seal extend in a U-shaped manner. In each case, the legs of said side portions which extend in a U-shaped manner lie in a plane. The portions of the sealing face, which are located one behind another when viewed in the axial direction of the gate passage opening, merge into flat sealing face portions which extend laterally outward for the abutment of the main portions of the seal in that region in which they have a common, straight, axially parallel generatrix. Said flat sealing face portions lie in planes which are parallel to one another and to the axis of the gate passage opening.

A suitable drive for such a transfer valve which is closable by means of a linear movement is provided in JP 6241344 (Buriida Fuuberuto). The drive described there has eccentrically mounted levers for linearly displacing the connecting rods on which the closure member is mounted.

US 2008/0053957 A1 (Wakabayashi) describes, among other things, valve gates for substrate processing systems having a kinked or curved valve cross section which are closable either by means of a multiple-stage L-shaped movement or by means of a linear movement.

The valve gate known from the prior art and described in U.S. Pat. No. 4,809,950 (Geiser) is described below by way of FIGS. 8a and 8b. The valve gate shown there in a purely schematic manner has a round opening cross section so as to illustrate better the development of the sealing faces, whilst the transfer valve known under the product name of "MONOVAT Series 02 and 03" and developed as a rectangular insert valve by VAT Vakuumventile AG in Haag, Switzerland has a rectangular opening cross section, the width of which is considerably greater than the height thereof.

DETAILED DESCRIPTION

The valve 101 for closing a flow path in a gas-tight manner by means of a linear movement has a valve housing 102 with an opening 103 for the flow path, the opening 103 having a geometric opening axis 104 along the flow path, as is shown in FIG. 8a. A closure member 105 shown in FIG. 8b is displaceable in a closing direction 108 in a linear manner along a geometric adjustment axis 106, which extends transversely with respect to the opening axis 104, in a closure member plane 107 from an open position which releases the opening 103 into a closed position pushed linearly over the opening 103 and is displaceable in reverse back in an opening direction 109, as shown in FIG. 8a.

FIGS. 8a and 8b show the valve housing 102 and the closure member 105 separately in the disassembled state, in particular the adjustment axis 106 clarifying the relative position and adjustability of the two parts 102 and 105.

A curved first sealing face 110 surrounds the opening 103 of the valve housing 102. A second sealing face 111 of the closure member 105, which corresponds with the first sealing face 110 and has a form which corresponds with the first sealing face 110, is arranged on the closure member 105. The design of the first sealing face 110 of the valve housing 102 is described above all below. As a result of the equivalent design which corresponds with the first sealing face 110, a detailed description of the corresponding second sealing face 111 can be dispensed with.

A seal (not shown), for example in the form of a vulcanized seal or an O-ring, is preferably arranged on the second sealing face 111, and/or on the first sealing face 110, said seal extending along the respective sealing face, in particular along the dot-dash line shown. For simplification, the sealing surfaces 110 and 111 will be considered below as sealingly active faces, that is the seal or the valve seat.

The first sealing face 110 is assembled from variously formed portions 112a, 112b, 114a, 114b which are in each case non-parallel to the adjustment axis 106. The surface normals 120 of the portions 112a, 112b, 114a, 114b of the first sealing face 110 have directional components which are in each case parallel to the adjustment axis 106. In other words, all the surface normals 120 of the first sealing face 110 point at least in part, that is with a directional component, into the opening direction 109, as shown in FIG. 8a by way of the surface normals 120 illustrated by means of short lines. Once again in other words, the first sealing face 110 points vertically or inclinedly into the opening direction 109 and does not extend parallel to the adjustment axis 106 in any portion. Consequently, none of the surface normals 120 of the first sealing face extends parallel to a geometric normal plane which is pierced vertically by the adjustment axis 106.

A first main portion 112a of the first sealing face 110, FIG. 8a, as well as a corresponding first main portion 112a' of the second sealing face 111, FIG. 8b, extend along a geometric first main plane 113a. The surface normals 120 of the first main portion 112a lie in the first main plane 113a. A second main portion 112b of the first sealing face 110, FIG. 8a, as well as a corresponding second main portion 112b' of the second sealing face 111, FIG. 8b, extend in contrast along a geometric second main plane 113b. The surface normals 120 of said main portion 112b lie in the second main plane 113b. The first main plane 113a and the second main plane 113b are spaced apart from one another, extend parallel to one another and parallel to the closure member plane 107. Consequently, the first main portion 112a and the opposite second main portion 112b have, with respect to one another, a geometric offset transversely with respect to the adjustment axis 106 and in the direction of the opening axis 104. The opening 103 is arranged between the two opposite main portions 112a and 112b in the region which extends along the adjustment axis 106.

A lateral first U-shaped side portion 114a of the first sealing face 110 connects the first main portion 112a and the second main portion 112b on the one side of the first sealing face 110, whilst a lateral second U-shaped side portion 114b of the first sealing face 110 connects the first main portion 112a and the second main portion 112b on the other side of the first sealing face 110.

The first U-shaped side portion 114a and the second U-shaped side portion 114b have in each case a first leg 115a which is associated with the first main portion 112a, a second leg 115b which is associated with the second main portion 112b and a base 115c. The two first legs 115a extend in each case along first leg planes which in each case are parallel to the adjustment axis 6 and which in each case lie on the first main plane 113a. In other words, the two first legs 115a and the first main portion 112a extend along a plane, namely the first main plane 113a, the surface normals of the first leg 115a and of the first main portion 112a lying in said first main plane 113a. The two second legs 115b extend, in turn, in each case along second leg planes which are parallel to the adjustment axis 6 and which lie in each case on the second main plane 113b. In other words, the second legs 115b and the second main portion 112b extend along a plane, namely the second main plane 113b, the surface normals of the two second legs 115b and of the second main portion 112b lying in said second main plane 113b. As also the first main portion 112a and the second main portion 112b, consequently the two first legs 115a have, with respect to the two second legs 115b, a geometric offset transversely with respect to the adjustment axis 106 and in the direction of the opening axis 104.

The respective base 115c of the first U-shaped side portion 114a and of the second U-shaped side portion 114b connects in each case the first leg 115a and the second leg 115b together and bridges the geometric offset transversely with respect to the adjustment axis 106 in the direction parallel to the opening axis 104. The two bases 115c lie on a common geometric plane E which is pierced vertically by the adjustment axis 106 and lies parallel to the opening axis 104.

By displacing the closure member 105 in a linear manner along the adjustment axis 106 in the closing direction 108, the second sealing face 111 can be moved into the closed position in which the second sealing face 111 presses onto the first sealing face 110 in the closing direction 8 and consequently is in sealing contact with the first sealing face 110, as a result of which the closure member 105 closes the opening 103 in a gas-tight manner by way of its lateral closure face 119.

Said vacuum valve, which is known from the prior art and is closable by means of a single linear movement, has numerous advantages in relation to the transfer valves which are closable by means of two movements and require a relatively complexly designed drive, or in relation to the wedge valves where the seals are acted upon in a transverse manner. As the closure member of the above-described vacuum valve is in one part, it can be exposed to high acceleration forces such that said valve can also be used for quick acting and emergency closures. The closing and sealing can be effected by means of one single linear movement such that very rapid closing and opening of the valve is possible. The circumferential seal provides clearly reproducible conditions for the diverse closing operations in all of its portions. As during closing and when the closing pressure occurs the seal is acted upon substantially only in the direction of the linear closing movement in the vertical direction onto the seal or partially in the longitudinal direction, not however transversely with respect to its longitudinal extension so that transverse forces onto the seal are avoided, said vacuum valve is suitable for highly qualified sealing tasks within the vacuum and high-vacuum range. The sealing faces can also be machined in order to meet the high demands made on the seal. The closure member itself has as few parts as possible which are moved toward one another, as a result of which the generation of particles which are harmful to the process and are caused in particular by friction, above all by metal abrasion and abrasive particles of the metal and plastics material elements, is able to be avoided in an extensive manner.

As can be seen from FIGS. 8a and 8b, the disadvantage of the described valve 101, however, is that the two side portions 114a and 114b, which are arranged laterally close to the opening 103, increase the width of the valve housing 102 in relation to the width of the opening 103. The U-shaped transition regions of the two sealing faces 110 and 111 consequently increase the extension of the valve housing 102 in width. Compared to L-type gate valves with an L-shaped movement development, the described, linearly adjustable valve 101 is relatively wide. In the case of numerous applications, this is not a problem, however there are operative ranges in particular of transfer valves in which the opening width ought to be as large as possible whilst maintaining a predetermined housing width. It would certainly be possible to have the lateral flanks of the main portions 112a and 112b ascend in a steeper manner and consequently to enlarge the angle between the surface normals 120 and the adjustment axis 106, as a result of which the alignment of the sealing faces 110 and 111 would approach a parallel alignment with respect to the adjustment axis 106, however, as a result the longitudinal load on the seal would be increased along its longitudinal development in the region of the steep flanks. This would certainly reduce the installation width of the valve in relation to the opening width, however the seal would be subject to greater wear.

A great advantage of the valve described is that, as a result of its development, the seal is not subject to a transverse load in the transverse direction to the longitudinal extension of the seal during closing. On the other hand, as a result of its transverse extension to the opening axis 104, the seal is hardly capable of absorbing forces which occur on the closure member 105 along the opening axis 104 and which can act on the closure member 105 in particular where there is a large amount of differential pressure, which requires the closure member 105, its drive and its mounting arrangement to be designed in a sturdy manner.

Although the described valve is already distinguished by an extraordinarily small particle generation, attempts are also made to reduce the generation of unwanted particles in the valve further.

In numerous processes, aggressive gases—for example an aggressive plasma flow—are used which attack the sealing material of the seal chemically to a considerable extent. This is the case in particular in etching processes or coating processes in the area of the semiconductor industry. Even in the closed position of the closure member, in particular in the case of a closed valve disk, the dynamic main seal of the valve disk is constantly exposed to the aggressive medium present on the one side of the valve as said medium moves to the dynamic main seal and is blocked by it. Consequently, the dynamic main seal of the valve disk is exposed to the aggressive medium and is subject to a certain increased amount of wear.

As a result of progress in semiconductor technology, the demands made on vacuum valve techniques have increased constantly over the last years. New semiconductor manufacturing methods consequently require the seals of a vacuum valve to be replaced in even shorter intervals. The vacuum valves known up to now from the prior art enable the seal to be replaced in part, for example by replacing the O-ring which is realized as a static seal. Vacuum valves, the connections of which, in contrast, have vulcanized static seals, make rapid replacement of the seal, however, impossible such that sometimes the entire valve disk has to be replaced.

For this reason, vacuum valves of the named type are regularly designed in such a manner that simple replacement of the dynamic seal is possible, for example by removing the valve disk on which the seal is arranged and replacing the valve disk for a new valve disk. A vacuum gate valve designed for this purpose which provides a maintenance opening for the simple removal of the valve disk as well as an interface which is suitable for rapid replacement between the valve disk and the connecting rod of the valve drive as well as a suitable multifunction tool is described in U.S. Pat. No. 7,134,642 (Seitz).

However, even a relatively rapid, simple replacement of the seal or of the seals or of the entire valve closure requires an interruption in the process, possibly a flooding of the chambers with ambient air and the use of replacement parts. It would be desirable to increase the service life of the seals and consequently to increase the maintenance and replacement intervals.

Consequently, it is an object of the invention to provide a valve for interrupting a flow path in a substantially gas-tight manner as well as a corresponding closure member, the dynamic seal of which has an increased service life.

It is a further object of the invention to create a vacuum valve of the type mentioned in the introduction as well as a corresponding closure member which is distinguished by simple design, a high adjustment speed, a small load on the seal, a reduced installation width and increased loadability.

The vacuum valve as claimed in the invention for closing a flow path in a gas-tight manner by means of a linear movement includes a valve housing with an opening for the flow path and a closure member which is displaceable in a linear manner along an adjustment axis. The flow path is to be understood in general as an opening path which is to be closed between two regions—in particular between two coating plants of any type, for example for solar or other applications, or between a process chamber for semiconductor manufacture and either a further process chamber or the outside world. The flow path is, for example, a corridor between two interconnected process chambers, it being possible to open the process chambers by means of the vacuum valve for transferring the semiconductor parts from the one process chamber to the next process chamber and subsequently to close them in a gas-tight manner to carry out the respective production step. As a result of the described field of application, these types of valves are also called vacuum transfer valves and as a result of their rectangular cross section in the majority of cases are also called rectangular gates. Obviously, however, any other arbitrary application of the vacuum valve as claimed in the invention for closing an arbitrary flow path in a substantially gas-tight manner is possible.

The opening can have an arbitrary, in particular rectangular, circular or oval cross section. The vacuum valve is preferably realized as a transfer valve with an elongated, in particular substantially rectangular opening cross section, the width of the opening at right angles to the adjustment axis preferably being at least twice or at least three times or at least five times the height of the opening parallel to the adjustment axis. However, it is also possible to develop the opening cross section in another manner, for example in a circular manner, the vacuum valve being a pump valve for example. The opening has a center axis which extends in the region of the opening in the center of the flow path parallel to said flow path. Said geometric opening axis stands, for example, vertically on the face spanned by the opening and extends along the flow path.

The closure member is generally the closure by means of which the opening is able to be closed in a gas-tight manner. The closure member, which can be realized as a valve disk, is displaceable in a linear manner along a geometric adjustment axis, which extends transversely with respect to the opening axis, in a closure member face between an open position and a closed position. The adjustment axis preferably extends vertically to the opening axis and lies on a plane which is pierced vertically by the opening axis. As an alternative to this, the adjustment axis extends inclinedly and non-parallel to the opening axis, the angle of intersection being in particular between 90 degrees and 45 degrees. The geometric adjustment axis lies on the geometric closure member face. The closure member face can extend parallel to a closure face defined by the closure element and is preferably substantially parallel to the face spanned by the opening. The closure member face is generally to be understood as a geometric face on which the adjustment axis lies and to which in a special embodiment the opening axis forms a surface normal, irrespective of the actual form of the closure face.

In the open position of the closure member, the same releases the opening in part or fully by being arranged in part or fully outside the projection range of the opening. In the closed position, the closure member is situated fully in the projection range of the opening, the closure face of the closure member pointing to the opening and covering the same preferably fully. The adjustment direction of the closure member along the adjustment axis from the open position into the closed position is called the closing direction, whereas the opposite adjustment direction from the closed position into the open position is defined as the opening direction.

The opening is surrounded by an at least partially curved first sealing face which is associated with the valve housing. This means that a first sealing face is arranged all around the opening. A second sealing face, the form of which corresponds with the first sealing face, is situated on the closure member. The second sealing face corresponds therefore with the first sealing face, the sealing faces having a form which corresponds to one another such that the second sealing face can rest on the first sealing face, the sealing faces being spaced along their development by a constant amount in the direction parallel to the adjustment axis. The second sealing face of the closure member surrounds the closure face of the closure member which is dimensioned in such a manner that it is able to cover the opening fully.

The first sealing face and the second sealing face lie opposite one another, it being possible to reduce or increase the spacing to the opposite position by adjusting the closure member along the adjustment axis.

In the closed position of the closure member, the second sealing faces lies on the first sealing face, a gas-tight contact between the sealing faces prevailing by pressing the second sealing face onto the first sealing face in the closing direction.

The first sealing face and the second sealing face are assembled in each case from variously formed portions which are non-parallel in each case to the adjustment axis. In other words, the surface normals of the portions of the first sealing face and of the second sealing face have in each case directional components which are parallel to the adjustment axis. Consequently, the first sealing face points vertically or inclinedly in the opening direction and the second sealing face points vertically or inclinedly in the closing direction. If the sealing faces lie one on top of another in the closed position and are pressed against one another in the closing direction, the seal lying in between is not acted upon exclusively longitudinally or even transversely, but is also at least in part constantly pressed vertically. The individual portions of the first and second sealing face correspond to one another insofar as they lie one on top of the other in the closed position. Consequently, in part only the respective portion of the first sealing face is described below.

In general, those faces of the valve housing and of the closure member which lie one on top of the other in the closed position and form the sealing contact are to be understood as sealing faces. The one sealing face can consequently be formed by the portion of a seal pointing vertically outward, in particular of an O-ring seal or a vulcanized seal, and the other sealing face is formed by a valve seat, that is a supporting face for the seal. The sealing faces are consequently those faces which actually bring about the gas-tight sealing as a result of mutual contact in the closed position. The seal can preferably be arranged on the closure member, but as an alternative to this can also be arranged on the valve housing, or on both parts.

The first sealing face and the second sealing face have, in each case, a first main portion which extends substantially along a geometric first main face. In other words, the first main portion extends in each case longitudinally along the first main face. The first main portion can extend in a straight or non-straight manner in the first main face or substantially along the first main face. In particular, it can have a curved shape. The first main portion does not forcibly have to extend in a geometrically precise manner in the first main face.

In addition, the first sealing face and the second sealing face have, in each case, a second main portion the shaping of which, in a special embodiment, can correspond substantially to the first main portion. However, it is also possible for the first main portions and the second main portions to have different forms. The respective second main portion of the first and second sealing face extends along a common geometric second main face, just as the first main portion it also being able to extend in a straight or non-straight manner in the second main face or extend purely substantially along the same.

The geometric first main face and the geometric second main face extend substantially parallel to one another, a slight skewed position being possible, and are spaced apart at least in the region of the sealing faces. The first and second main faces lie substantially parallel to the closure member face. The closure axis consequently extends substantially parallel to the first and second main face. As a result of the spacing between the two main faces, the first main portion and the opposite second main portion have, with respect to one another, a geometric offset transversely with respect to the adjustment axis, substantially in the direction of the opening axis.

The opening is arranged between the first main portion and the opposite second main portion of the first sealing face of the valve housing in the region extending along the adjustment axis. The closure face of the closure member lies between the first and the second main portion of the second sealing face.

A lateral first U-shaped side portion of the first sealing face connects the first main portion and the second main portion together on the one side of the first sealing face, whilst a lateral second U-shaped side portion of the first sealing face connects the first main portion and the second main portion together on the other side of the first sealing face, as a result of which the first sealing face is closed. Corresponding U-shaped side portions are arranged on the second sealing face.

The first U-shaped side portion and the second U-shaped side portion are assembled in each case from a first leg which is associated with the first main portion, a second leg which is associated with the second main portion and, in a special embodiment, is formed by the same, and a base. Said base is realized, for example, as a two-dimensional arc, a plane or as a three-dimensional segment of a helix or has another form for connecting the legs.

The first leg of the first U-shaped side portion of the first sealing face extends in particular substantially along a first leg plane of the first U-shaped side portion. The first leg of the second U-shaped side portion of the first sealing face also extends in particular substantially along a first leg plane of the second U-shaped side portion. Said two first leg planes of the first sealing face preferably extend parallel to the adjustment axis. In other words, the two first legs extend in each case substantially along first leg planes which are parallel to the adjustment axis. As also in the case of the main faces, it is not forcibly necessary for the first legs to lie precisely on the first leg planes. For example, a slightly curved development of the legs along the leg plane is possible. As an alternative to this, the legs can lie on free-form faces.

The two second legs of the first sealing face also extend in particular in each case substantially along a second leg plane which in each case extends parallel to the adjustment axis. Said second leg planes can be formed by the second main face in a special embodiment.

The first leg and the second leg have in each case, with respect to one another, a geometric offset transversely with respect to the adjustment axis. Said offset can correspond to the offset of the two main portions in a special embodiment.

The respective base which is arranged in each case between a pair of legs, connects in each case the first leg and the second leg together and bridges the geometric offset transversely with respect to the adjustment axis.

As claimed in a first aspect of the invention, in the closed position of the valve not only is a sealing contact produced between the two main sealing faces of the valve, but also, as a result of two inclined faces which are arranged non-parallel to the adjustment axis of the closure member around the opening or on the closure member, a barrier is created between the region of the opening and the sealing faces by the two inclined faces in the closed position being in a close or contacting opposite position and consequently holding the aggressive medium largely away from the two main sealing faces of the valve. In other words, the two inclined faces form a wedge-like additional seal or pre-seal which acts between the opening and the main seal.

The valve housing has in the region between the opening and the first sealing face a first inclined face which surrounds the opening. In other words, an in particular ring-shaped or frame-shaped first inclined face which extends radially between the opening and the different portions of the first sealing face, is arranged all around the opening. The first inclined face is preferably defined directly or indirectly on the inside by the opening and on the outside by the first sealing face. The closure member has a second inclined face which extends parallel to the first inclined face, corresponds with the first inclined face and has a form which corresponds with the first inclined face. This means that the two inclined faces have a form which corresponds to one another in a functional manner at least in a part portion all around the opening and can be moved to lie one on top of another or almost one on top of another with a constant gap along the circumference of the opening.

Both the first inclined face and the second inclined face stand inclinedly, and certainly slightly inclinedly,—at least in the closed position or also in the open position of the closure member—in each case at a certain angle of inclination in relation to the closure member face in such a manner that the first inclined face of the valve housing points inclinedly in the opening direction and the second inclined face of the closure member points inclinedly in the closing direction. This means that the two inclined faces that are parallel to one another lie non-parallel, however almost-parallel to the closure member face and also non-parallel, but almost parallel to the adjustment axis, but stand inclinedly in relation to the same, namely at the named certain angle of inclination. The first inclined face and the second inclined face are intersected in their geometrical extensions by the geometric adjustment axis at the named, specific angle of inclination.

As claimed in the invention, said angle of inclination is between 3 and 15 degrees. In other words, the two inclined faces are set inclinedly by between 3 and 15 degrees in relation to the closure member face.

The first inclined face and the second inclined face lie in such a manner with respect to one another that the second inclined face in the closed position of the closure member is arranged in the parallel position opposite the first inclined face with a relative spacing of between 0 and 0.6 mm with respect to one another. In other words, the two inclined faces are movable toward one another in a wedge-like manner in the closing direction as a result of adjusting the closure member from the open position into the closed position in such a manner that the vertical spacing between the inclined faces in the closed position is only still between 0 and 0.6 mm and consequently an aggressive medium which bears against the opening of the valve, is prevented from directly penetrating to the first and second sealing face of the valve. The spacing all around the opening is preferably substantially the same value, with less than 10% preferably being rejected. Insofar as the spacing is equal to 0, there is contact all around the opening between the inclined faces.

In a possible embodiment, both the first inclined face of the valve housing and the second inclined face of the closure member are realized in a non-elastic manner. This refers to the fact that the two inclined faces do not consist of a desired elastic material. In particular, the two inclined faces are machined faces of the basic material of the valve housing or of the closure member. In particular, the two inclined faces are formed by metal faces. In said embodiment, the vacuum valve is realized in such a manner that the spacing between the inclined faces in the closed position of the closure member is as small as possible, however, touching contact between the two inclined surfaces with respect to one another in the closed position is avoided. Such contact where two metal inclined faces are used would result in the generation of friction particles, as a result of which the purity of the process could possibly be endangered as a result of particle generation. Very good results are achieved, depending on the type of aggressive medium, with a spacing between the two inclined faces of between 0.05 mm and 0.6 mm and optimal results are achieved with a spacing of between 0.05 mm and 0.3 mm. As a result of a such a small gap of less than 0.6 mm, the aggressive medium is no longer able to pass unobstructed to the main seal such that said seal is extensively protected.

In order to protect the main seal in a largely complete manner from direct contact with the aggressive medium, the invention also provides that the first inclined face or the second inclined face is formed by an additional elastic seal. It is also possible for both the first and the second inclined face to be formed by additional elastic seals. The spacing between the two inclined faces in the closed position of the closure member in this case is equal to 0. In other words, in this case the two inclined faces touch one another in the closed position and are in particular slightly squeezed such that an—at least slightly—sealing contact is created by the inclined faces all around the opening, as a result of which the main sealing faces lying further outside, in particular the elastic main seal, are protected. The at least one additional elastic seal can be formed, for example, by an O-ring which is arranged in a groove on the valve housing and/or the closure member. The O-ring can have an arbitrary cross section, preferably however a circular cross section, a kidney-shaped cross section or an X-shaped cross section. An O-ring with a cross section of this type is known, for example, under the trade name QUADRING® manufactured by TRELLEBORG. As an alternative to this, it is possible for the additional elastic seal to be formed by a seal which is vulcanized on the valve housing and/or on the closure member.

In order to protect not only the main seal but in addition to enable electric shielding of the two regions which can be separated by means of the valve, the invention provides within the framework of a further development that the first inclined face of the valve housing is realized as an electrically conducting metal face which is coupled with the valve housing with regard to electric potential and the second inclined face is realized as a closed, electrically conducting protective shield. Said electrically conducting protective shield is arranged in such a manner on the closure member that, in the closed position of the closure member, it fully covers the opening and all around the opening is connected electrically to the first inclined face. The spacing in the closed position is equal to 0 for producing the electric contact all around the opening. As a result of said all-round said electric contact with the valve housing, the protective shield is coupled with the valve housing in a potential electrical manner.

A further development of the invention provides that the valve housing and/or the closure member has, in particular in the ring-like or frame-like region between the first inclined face of the valve housing and the first sealing face, a recess which surrounds the first inclined face, in particular in the form of a groove or an undercut, which is arranged in such a manner and developed in such a manner on the valve housing and/or the closure member that the spacing between the valve housing and the closure member is at least 0.8 mm, in particular between 0.8 mm and 6 mm, in the region of the recess. In other words, a channel-like recess surrounds the first inclined face. The depth of said channel-like recess with reference to the inclined face is preferably between 0.8 and 5 mm. By means of said recess, a labyrinth-like turbulence structure is created which causes the medium penetrating through the narrow region between the inclined faces to swirl such that said medium is additionally obstructed from penetrating further to the main sealing faces. The width of said recess is in particular quarter to quadruple, in particular half to double the depth thereof.

In addition, the first aspect of the invention includes a closure member, in particular the vacuum valve as claimed in the invention described in the introduction. As the features of the closure member have already been described directly or indirectly in conjunction with the vacuum valve and the various further developments thereof as claimed in the invention, reference is made to the statements made above.

The closure member for closing a flow path in a gas-tight manner by means of a linear movement has a geometric adjustment axis in a closure member face and a second sealing face. Said second sealing face is assembled from variously formed portions which are in each case non-parallel to the adjustment axis. The surface normals of the portions of the second sealing face have directional components which are in each case parallel to the adjustment axis. Consequently the second sealing face points vertically or inclinedly in an opening direction of the adjustment axis. A first main portion of the second sealing face extends substantially along a geometric first main face. A second main portion of the second sealing face extends substantially along a geometric second main face. The first main face and the second main face extend parallel to the adjustment axis, are spaced apart from one another and extend substantially parallel to the closure member face. Consequently, the first main portion and the opposite second main portion have, with respect to one another, a geometric offset transversely with respect to the adjustment axis. A lateral first U-shaped side portion of the second sealing face connects the first main portion and the second main portion on the one side of the second sealing face, whilst a lateral second U-shaped side portion of the second sealing face connects the first main portion and the second main portion on the other side of the second sealing face. The first U-shaped side portion and the second U-shaped side portion have in each case a first leg which is associated with the first main portion, a second leg which is associated with the second main portion and a base. The first leg and the second leg have, with respect to one another, a geometric offset transversely with respect to the adjustment axis. The respective base connects in each case the first leg and the second leg and bridges the geometric offset transversely with respect to the adjustment axis. By means of the second sealing face, in a closed position of the closure member, a sealing contact with a first sealing face of a vacuum valve for closing an opening of the vacuum valve in a gas-tight manner is producible by pressing the second sealing face in a linear manner onto the first sealing face in a closing direction of the adjustment axis.

As claimed in the invention, a second inclined face of the closure member is arranged in the region between the portions of the second sealing face. The second inclined face is inclined at an angle of inclination in relation to the closure member face in such a manner that the first inclined face points inclinedly in the opening direction, which is opposite to the closing direction, and the first inclined face is intersected in its geometric extension by the geometric adjustment axis at the angle of inclination. The angle of inclination is between 3 and 15 degrees. The second inclined face is realized in such a manner that, in the closed position of the closure member, the second inclined face is movable into the parallel position opposite to a first inclined face which surrounds the opening and is arranged in the region between the opening and the first sealing face.

As claimed in a first further development of the closure member, the second inclined face is realized as a closed, electrically conducting protective shield, by means of which, in the closed position, the opening can be fully covered. As an alternative to this, the second inclined face is formed by an additional elastic seal which is formed in particular by an O-ring which is arranged in a groove, said O-ring having in particular a circular cross section, a kidney-shaped cross section or an X-shaped cross section, or by a seal which is vulcanized on the closure member.

The named first aspect of the invention is combinable with the features of the transfer valve, which has already been described in the introduction, is known from the prior art in particular under the product name "MONOVAT Series 02 and 03" by VAT Vakuumventile AG in Haag, Switzerland and is described, for example, in U.S. Pat. No. 4,809,950 (Geiser) and U.S. Pat. No. 4,881,717 (Geiser).

In said case of the known remaining design of the valve and the closure actuator, the two first legs extend in each case substantially along first leg planes which are parallel to the adjustment axis. The two second legs also extend substantially along second leg planes which are parallel to the adjustment axis. The first main face, the second main face, the closure member face, the first inclined face and the second inclined face are formed in each case by geometric planes. The first leg planes lie on the geometric plane of the first main face and the second leg planes lie on the geometric plane of the second main face. However, it is also possible for the main faces to be curved or kinked, in particular about an axis of curvature which is parallel to the adjustment axis.

As claimed in a second aspect of the invention, which is combinable with the first aspect of the invention, and vice versa, the first leg planes are in each case angled by at least 15 degrees in relation in each case to an adjacent, geometric first tangential plane to the first main face which is associated therewith. In other words, the first legs do not extend in the first main face or the first tangential planes of the first main portion, but are pivoted out of said first main face or the first tangential planes by at least 15 degrees, the pivot axis extending parallel to the adjustment axis. In order to enable a transition of the first sealing face from the first main portion to the respective first leg, a first curvature portion of the first sealing face is arranged in each case between the first main portion and the two first legs of the first sealing face. The first sealing face, which extends in the first main portion along the first main face, merges at the two ends of the first main portions into the respective first curvature portion. Said respective transition from the first main portion into the one first curvature portion and the other first curvature portion is effected in each case in a geometric first tangential plane. The one first tangential plane is the tangential plane of the first main face at the one end of the first main portion. The other first tangential plane is the tangential plane of the first main face at the other end of the first main portion. The two first tangential planes are substantially parallel to the adjustment axis. The two first leg planes are in each case angled by at least 15 degrees in relation to the respective first tangential plane. The first sealing face, which extends in the first main portion along the first main face, is consequently guided out of the first main face by the at least 15 degrees, in particular by means of a geometric curvature, and merges in each case into the respective first leg plane. Said guiding out and the transition are effected in each case in the first curvature portion. In other words, by means of said respective first curvature portion, the first sealing face, which extends in the first main portion along the first main face, is therefore guided out of the first main face by the named at least 15 degrees and merges into the first leg plane. The respective first curvature portion is situated therefore in the region of the pivot axis and enables a transition of the first sealing face from the first main face into the first leg plane. The first curvature portion can be a geometric curvature, for example an arc, a link between the planes or another two-dimensional or three-dimensional shape.

In a further development of the invention, the two first leg planes are also angled in each case about at least 15 degrees in relation in each case to an adjacent, geometric second tangential plane to the second main face associated therewith. A second curvature portion of the first sealing face is arranged in each case between the second main portion and the two second legs of the first sealing face. The first sealing face, which extends in the second main portion along the second main face, merges in each case into the second curvature portion, the respective transition from the second main portion into the respective second curvature portion being effected in each case in the geometric second tangential plane to the second main face. The two second leg planes are angled in each case about the at least 15 degrees in relation to the respective second first tangential plane. The first sealing face, which extends along the second main face in the second main portion, in the second curvature portion is guided out of the second main face by the at least 15 degrees, in particular by means of a geometric curvature, and merges into the second leg plane. In other words, the first sealing face is guided out of the second main face in each case by at least 15 degrees and merges in each case into the two second leg planes. The respective second curvature portion can correspond to the adjacent first curvature portion in its shape or can be developed in another manner. In a particular embodiment, the respective first leg plane and the respective second leg plane of the first U-shaped side portion extend substantially parallel to one another, in a further embodiment the respective first leg plane and the second leg plane of the second U-shaped side portion also extending substantially parallel to one another.

In other words, said second aspect of the invention differs from the vacuum valve for closing a flow path in a gas-tight manner by means of a linear movement, which has been described in the introduction and is known from the prior art, in particular in that the two side portions, in which the geometric offset of the two main portions is bridged transversely with respect to the adjustment axis and the offset main portions are brought together, are pivoted inward in the direction of the opening axis or are pivoted outward, by at least 15 degrees. Said pivoting of the side portions inward or outward, carried out preferably about a pivot axis which is substantially parallel to the adjustment axis, causes the transition region of the offset sealing portions to extend also in the direction of the opening axis and not only transversely with respect to the same. In a particular embodiment, in particular in the case of a pivot angle of 90 degrees, said transition region extends even exclusively along the opening axis. Consequently, the valve housing becomes narrower with the opening width remaining the same, the depth of the valve housing and of the closure member being somewhat enlarged.

It has been shown in a surprising manner that numerous further considerable advantages are also produced as a result of said pivoting of the side portions inward or outward. Thus, the described three-dimensional extension of the sealing face is proven to be a particularly rigid development for the closure member and the valve housing so that it is possible to convert an even greater longitudinal extension, it being possible in an extensive manner to avoid deformations in the case of high pressure differences. Consequently, the opening width can be considerably enlarged, which is particularly advantageous above all in the case of transfer valves for the transfer of wide semiconductor and substrate units. In addition, the pivoting of the side portions inward causes the seal, which is loadable exclusively in the closing direction in the prior art, now also to be able to be loaded in a direction along the opening axis as, in this case, the seal is no longer acted upon in the side portions exclusively transversely with respect to its longitudinal extension, but both vertically and in the longitudinal direction. Consequently, the seal can absorb part of the force which acts on the closure member in the case of a pressure difference. The seal geometry as claimed in the invention is largely insensitive to differential pressure.

As a result of the width gained in the valve housing, it is also possible to utilize the lateral installation space for installing the linear drive. The linear drive is consequently moved out of the critical particle region such that particle generation is reduced further. The valve is distinguished by said arrangement of the drives and in addition by a compact method of installation. High accelerations are possible as a result of direct movement transmission.

The first leg planes and/or the second leg planes are angled by at least 15 degrees in relation to the main face, that is they are pivoted out of the first main face or second main face. In a further development of the invention, said angle is at least 30 degrees or at least 45 degrees or at least 60 degrees. The angle should be a maximum of 120 degrees, preferably a maximum of 90 degrees.

The first main face can be formed by a geometric plane, that is a first main plane. In this case, the two first tangential planes and the first main plane lie one on top of another such that the first tangential planes are formed by the first main plane. The second main face can also be formed by a geometric plane, that is a second main plane, the two second tangential planes and the second main plane lying one on top of another such that the second tangential planes are formed by the second main plane. It is equally possible for the closure member face to provide a geometric plane and consequently to be a closure member plane. If both of the main faces are consequently main planes, the two main portions in each case extend on one plane. The main portions, however, do not forcibly have to extend in a geometrically precise manner in the first main plane or the second main plane. It is possible for the main portions to extend purely substantially along the first or second main plane, that is geometrically not precisely parallel to the respective main plane, for example as an arc along the respective main plane.

For certain applications, however, it is advantageous when, in place of a valve with a flat basic cross section, a valve with a curved basic cross section is used. In this case, the closure member does not have a flat disk form with a flat closure member plane, but a basic form which is curved at least in a part portion about a curvature axis—which is in particular substantially parallel to the adjustment axis. Particularly in the case of a wide transfer valve, a curved development of the basic cross section has considerable advantages. In the event of a large angle of curvature, for example of in excess of 60 degrees, it is possible to carry out a transfer through the valve in an inclined manner with respect to the opening axis. In the event of an angle of curvature of 90 degrees, it is possible, for example, to move semiconductor elements, in particular wafers, along a first transfer axis, which is, for instance, at 45 degrees to the opening axis, through the open valve into a process chamber and to move them along a second transfer axis, which extends, for instance, at 90 degrees to the first transfer axis and for instance 45 degrees to the opening axis, through the open valve out of the process chamber. A further advantage of a curved basic cross section is in the increased stability of the valve in the closed position of the closure member. As a result of the three-dimensional extension of the sealing face brought about by the curved basic cross section, a particularly rigid development for the closure member and the valve house is produced even at a curvature of only 15 degrees such that deformations at high pressure differences can additionally be avoided and the opening width can be considerably enlarged. This is an advantage particularly in the case of transfer valves for the transfer of wide semiconductor and substrate units. Consequently, a further aspect of the invention provides that the first main face, the second main face and the closure member face are curved at least in a part portion, in particular in several part portions or in the entire region about an axis of curvature—which is in particular substantially parallel to the adjustment axis. The curvature at least in said part portion can be formed by a circular cylindrical face or another free form. In particular, the first main face, the second main face and the closure member face are curved at least in the part portion about the axis of curvature by at least 15 degrees, in particular by at least 30 degrees, in particular by at least 45 degrees, in particular between 45 degrees and 105 degrees. It is possible for the curvature to be effected about several axes of curvature and in various directions of curvature, for example in the form of a wavy curvature. The axis of curvature preferably extends substantially parallel to the adjustment axis. However, it is also possible for the axis of curvature to extend in a non-parallel manner to the adjustment axis and to intersect it either at an angle which is not equal to 90 degrees or to extend to it in a skew manner. In general terms, the axis of curvature extends in a non-parallel manner to a plane which is pierced vertically by the adjustment axis. In particular, the axis of curvature intersects said plane at an angle of between 90 and 60 degrees, in particular between 90 and 45 degrees, in particular between 90 and 30 degrees. The radius of curvature can be greater or smaller than the width or equal to the width of the opening. The radius can also be small in such a manner that the curvature provides a kink. In a particular embodiment of the invention, the axis of curvature intersects the opening axis, in particular at an angle of intersection of approximately 90 degrees.

The main portions can have an arbitrary development along the main faces. For example, they can extend in an arcuate manner on the respective main face, as in the case of the vacuum gate which has been described in the introduction and is known from the prior art.

Said part aspect of the second aspect of the invention, which includes a curvature of the main faces, is also combinable with the valve of the type named in the introduction, which is known from the prior art and which is known under the product name of "MONOVAT Series 02 and 03" and is described in U.S. Pat. No. 4,809,950 (Geiser) and U.S. Pat. No. 4,881,717 (Geiser).

In a further development of the invention which is preferred above all for a transfer valve, the main portions extend, however, in a straight manner along the main face. The first main portion extends on a first horizontal plane, to which the adjustment axis forms a surface normal. The second main portion extends on a second horizontal plane, to which the adjustment axis also forms a surface normal. The first horizontal plane and the second horizontal plane lie parallel to one another and are spaced apart from one another. The main faces, in the case of said embodiment, lie preferably vertically with respect to the horizontal planes. The horizontal planes do not refer to an absolute horizon of the world coordinate system, but refer to the valve housing and the width extension thereof. Consequently, the two main portions preferably extend parallel to one another. In order to bridge said offset of the main portions in the direction of the adjustment axis, the two first legs, the two second legs and the two bases extend between the first horizontal plane and the second horizontal plane, the two first legs and/or the two second legs and/or the two bases bridging at least in part the spacing between the first horizontal plane and the second horizontal plane as a result of extending at least in part in the direction parallel to the adjustment axis.

In a special further development, the two bases extend on a common third horizontal plane which lies between the first horizontal plane and the second horizontal plane and to which the adjustment axis forms a surface normal. In other words, the third horizontal plane extends parallel to the other horizontal planes and, in a special further development of the invention, is arranged centrally between the first horizontal plane and the second horizontal plane. As the bases lie on the third horizontal plane, in the case of said invention variant, they do not extend along the adjustment axis and do not contribute to the named bridging of the spacing between the main portions in the direction parallel to the adjustment axis. In an alternative variant, the bases, however, do not lie on a horizontal plane. The two bases bridge the spacing between the first horizontal plane and the second horizontal plane in part by being realized in each case as a segment of a helix which extends in particular substantially parallel to the adjustment axis.

The two first curvature portions of the first sealing face can extend on the first main face and the two second curvature portions can extend on the second main face. In said case, the curvature portions do not bridge the offset of the main portions in the direction parallel to the adjustment axis. However, it is also possible for the curvature portions to be curved not only about an axis of curvature which extends parallel to the adjustment axis, as has already been described above, but also about an axis of curvature which lies transversely with respect to the adjustment axis. In this case, the first sealing face is also curved inward in the direction of the opposite portion of the first sealing face.

Consequently, the two first curvature portions and the two second curvature portions extend between the first horizontal plane and the second horizontal plane, the two first curvature portions and the two second curvature portions partially bridging the spacing between the first horizontal plane and the second horizontal plane. The described curvature can be achieved, for example, as a result of the two first curvature portions and the two second curvature portions being realized as a segment of a helix which extends substantially parallel to the adjustment axis.

In addition, the second aspect of the invention includes a closure member, in particular the vacuum valve as claimed in the invention and described in the introduction. As the features of the closure member have already been described directly or indirectly in conjunction with the vacuum valve and the various further developments thereof as claimed in the invention, reference is made to the statements made above.

In general, the closure member for closing a flow path in a gas-tight manner by means of a linear movement, includes a geometric adjustment axis in a closure member face and a second sealing face which is assembled from variously formed portions which in each case are not parallel to the adjustment axis. The surface normals of the portions of the second sealing face have in each case directional components which are parallel to the adjustment axis. Consequently, the second sealing face points vertically or inclinedly in an opening direction of the adjustment axis. A first main portion of the second sealing face extends substantially along a geometric first main face, whilst a second main portion of the second sealing face extends substantially along a geometric second main face. The first main face and the second main face are spaced apart from one another and extend parallel to the adjustment axis and substantially parallel to the closure member face. Consequently, the first main portion and the opposite second main portion have, with respect to one another, a geometric offset transversely with respect to the adjustment axis. A closure face of the closure member—which extends in a particular embodiment substantially parallel to the closure member face—is arranged between the two opposite main portions. A lateral first U-shaped side portion of the second sealing face connects the first main portion and the second main portion on the one side of the second sealing face, whilst a lateral second U-shaped side portion of the second sealing face connects the first main portion and the second main portion on the other side of the second sealing face. The first U-shaped side portion and the second U-shaped side portion are assembled in each case from a first leg which is associated with the first main portion, a second leg which is associated with the second main portion and a base. The two first legs extend in each case substantially along first leg planes which lie parallel to the adjustment axis. The first leg and the second leg have, with respect to one another, a geometric offset transversely with respect to the adjustment axis, the respective base in each case connecting the first leg and the second leg and bridging the geometric offset transversely with respect to the adjustment axis. By means of the second sealing face, in a closed position of the closure member, a sealing contact is producible with a first sealing face of a vacuum valve for closing an opening of the vacuum valve in a gas-tight manner by the second sealing face being pressed in a linear manner onto the first sealing face in a closing direction of the adjustment axis.

As also in the case of the vacuum valve which has the described closure member, in the case of the closure member as claimed in the invention the two first leg planes are angled in each case by at least 15 degrees in relation to the first main face. In each case, a first curvature portion of the second sealing face is arranged between the first main portion and the two first legs. The second sealing face, which extends along the first main face in the first main portion, merges in each case into the first curvature portions, the respective transition from the first main portion into the respective first curvature portion is effected in each case in a geometric first tangential plane to the first main face. The two first leg planes are angled in each case by at least 15 degrees in relation to the respective first tangential plane. The second sealing face, which extends along the first main face in the first main portion, is guided in the first curvature portion out of the first main face by at least 15 degrees, in particular by means of a geometric curvature such that the second sealing face merges into the first leg plane.

The closure member has the same further development variants which have already been described in conjunction with the vacuum valve and to which reference is hereby made. In particular, one further development includes the two second legs extending substantially along second leg planes which are parallel to the adjustment axis and a second curvature portion of the second sealing face being arranged in each case between the second main portion and the two second legs. The second sealing face, which extends in the second main portion along the second main face, merges in each case into the second curvature portions, the respective transition from the second main portion into the respective second curvature portion being effected in each case in a geometric second tangential plane to the second main face. The two second leg planes are angled in each case by at least 15 degrees in relation to the respective second tangential plane. The second sealing face, which extends in the second main portion along the second main face, is guided in the second curvature portion out of the second main face by at least 15 degrees, in particular by means of a geometric curvature, and merges in the second curvature portion into the second leg plane. In addition, it is possible for the first leg plane and the second leg plane of the first U-shaped side portion to extend substantially parallel to one another and in addition the first leg plane and the second leg plane of the second U-shaped side portion to extend substantially parallel to one another.

As also in the case of the vacuum valve, the first main face can be formed by a geometric plane, that is a first main plane. In this case, the two first tangential planes and the first main plane lie one on top of another such that the first tangential planes are formed by the first main plane. The second main face can also be formed by a geometric plane, that is by a second main plane, the two second tangential planes and the second main plane lying one on top of another such that the second tangential planes are formed by the second main plane. It is equally possible for the closure member face to provide a geometric plane and consequently to be a closure member plane. If both of the main faces are consequently main planes, the two main portions in each case extend on one plane. The main portions, however, do not forcibly have to extend in a geometrically precise manner in the first main plane or the second main plane. It is possible for the main portions to extend purely substantially along the first or second main plane, that is geometrically not precisely parallel to the respective main plane, for example as an arc along the respective main plane.

As already explained in conjunction with the vacuum valve, it is, however, advantageous for certain applications when, in place of a valve with a flat basic cross section, a valve with a curved basic cross section is used. In this case, the closure member does not have a flat disk form with a flat closure member plane, but a basic form which is curved at least in a part portion about a curvature axis which is in particular substantially parallel to the adjustment axis. Consequently a further aspect of the invention provides that the first main face, the second main face and the closure member face are curved at least in a part portion, in particular in several part portions or in the entire region about an axis of curvature which is substantially parallel to the adjustment axis. The curvature at least in said part portion can be formed by a circular cylindrical face or another free form. In particular, the first main face, the second main face and the closure member face are curved at least in the part portion about the axis of curvature by at least 15 degrees, in particular by at least 30 degrees, in particular by at least 45 degrees, in particular between 45 degrees and 105 degrees. As also in the case of the vacuum valve, it is possible for the curvature to be effected about several axes of curvature and in various directions of curvature, for example in the form of a wavy curvature. The radius of curvature can be greater or smaller than the width or equal to the width of the opening. The radius can also be small in such a manner that the curvature provides a kink. In a particular embodiment of the invention, the curvature axis intersects the opening axis, in particular at an angle of intersection of approximately 90 degrees.

Further developments which have already been described in conjunction with the vacuum valve are also included by the invention which relates to the closure member and reference is made to the above statements.

The vacuum valves as claimed in the invention and the closure members as claimed in the invention are described below in more detail purely as an example by way of concrete exemplary embodiments which are shown schematically in the drawings, details of further advantages of the invention also being given, in which:

FIG. 2a shows a top view of a closure member of the first embodiment of the vacuum valve with a flat main face;

FIG. 2b shows a front view of the closure member;

FIG. 2c shows a side view of the closure member;

FIG. 2d shows an oblique view of the closure member;

FIG. 3a shows a front view of the first embodiment of the vacuum valve as claimed in the invention with the closure member in the closed position;

FIG. 3a shows a front view of the first embodiment of the vacuum valve as claimed in the invention with the closure member in the closed position;

FIG. 3b shows a lateral cross section of the vacuum valve from FIG. 3a;

FIG. 3c shows a front view of the first embodiment of the vacuum valve as claimed in the invention with the closure member in the open position;

FIG. 3d shows a lateral cross section of the vacuum valve from FIG. 3c;

FIG. 4a shows a lateral cross section of a second embodiment of the vacuum valve as claimed in the invention with the closure member in the open position;

FIG. 4b shows an oblique view of a half section of a valve housing of the second embodiment of the vacuum valve as claimed in the invention;

FIG. 7a shows an oblique view of the closure member from FIG. 6a;

Figure 8A:
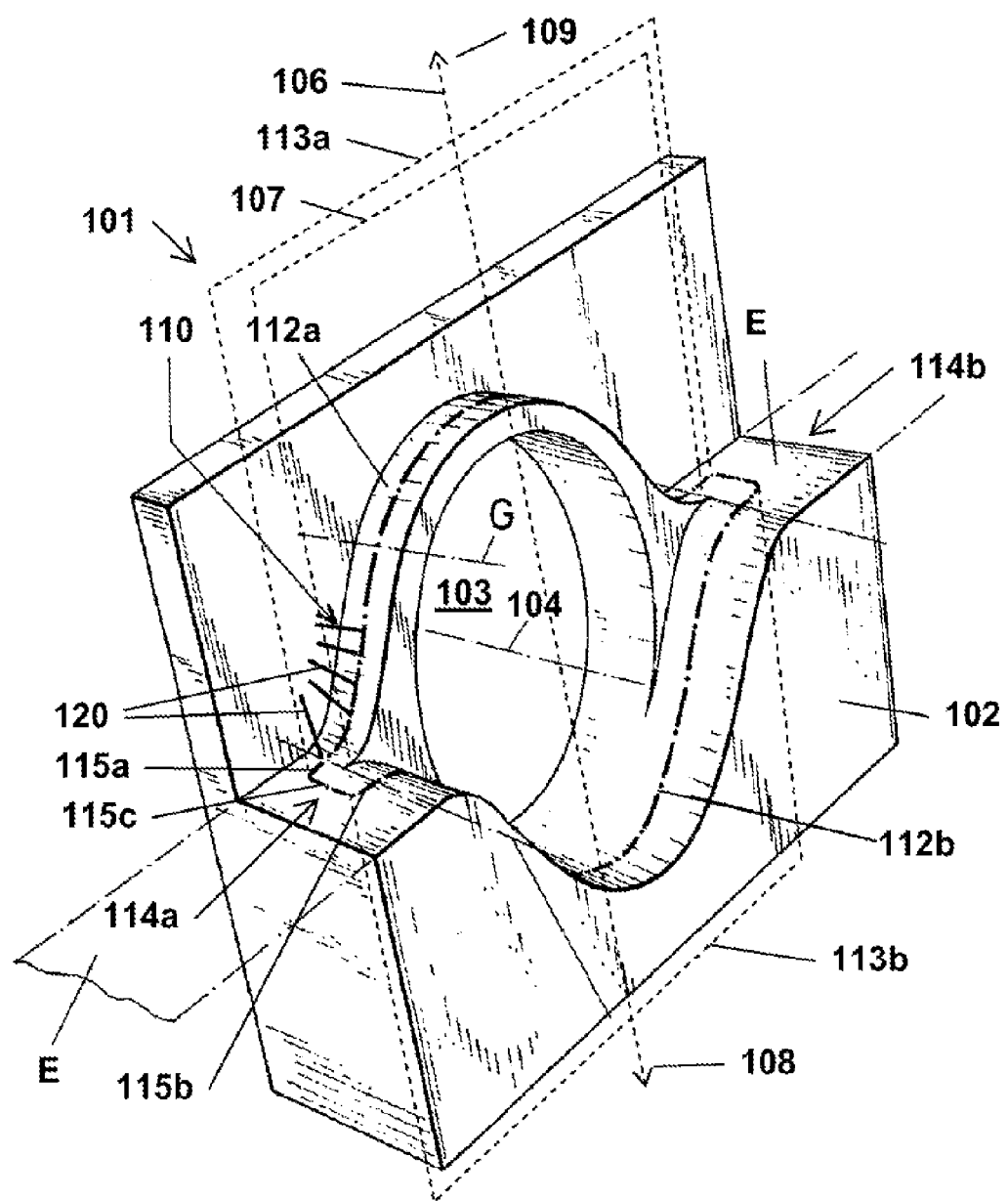
FIG. 8a shows a valve housing of a vacuum gate known from the prior art.
Figure 8B:
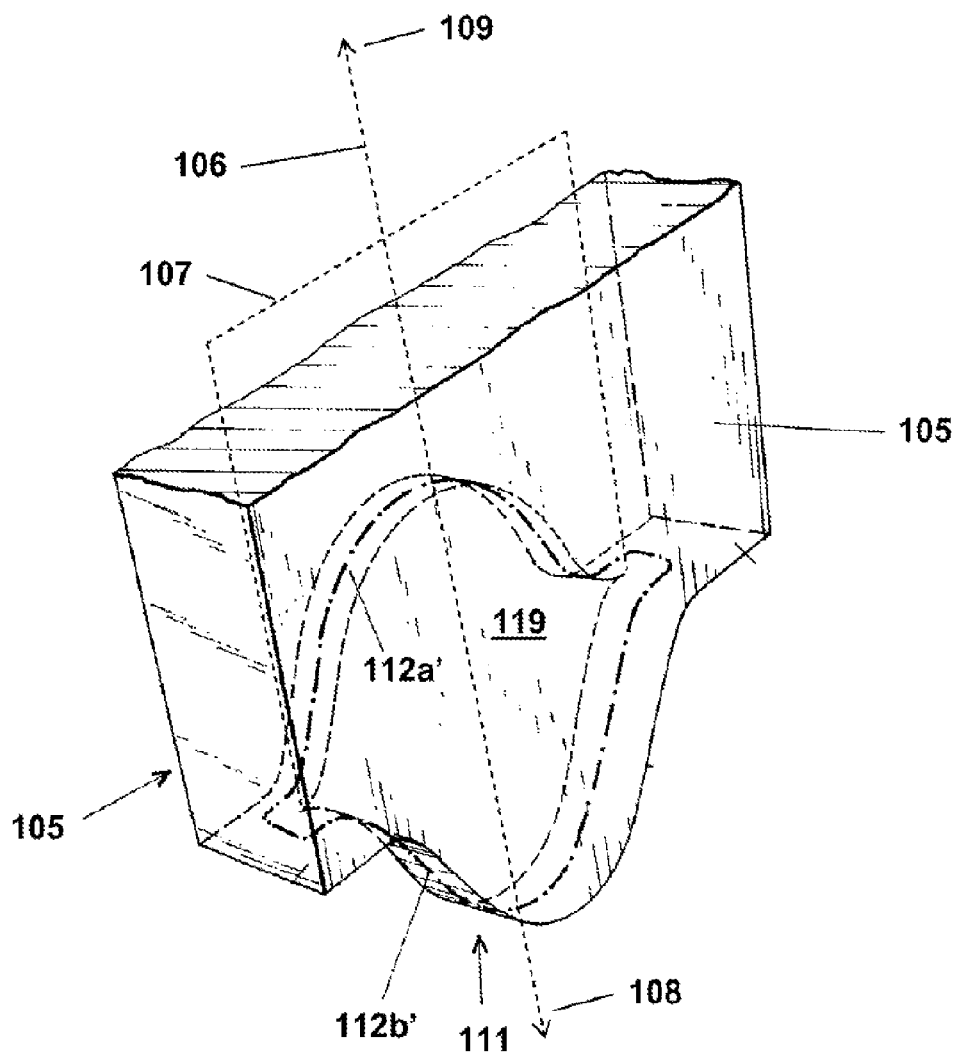
FIG. 8b shows a closure member of a vacuum gate known from the prior art.

FIGS. 1a to 2e, 3a to 3e and FIGS. 4a to 5e show in each case a common, exemplary embodiment of a vacuum valve as claimed in the invention or of a closure member in various states, from various views and in various degrees of detail. Consequently, in each case said groups of figures are described together. The variants according to FIGS. 2f and 2g as well as the exemplary embodiment according to FIGS. 4a to 5e differ purely with reference to certain features from the exemplary embodiment according to FIGS. 1a to 2e and 3a to 3e, which is why in part only details of the differences between the variants and embodiments is given. In part, details of references and features which have already been explained in preceding figures will not be given again. FIGS. 8a and 8b have already been detailed in conjunction with the representation of the prior art.

Figure 1A:
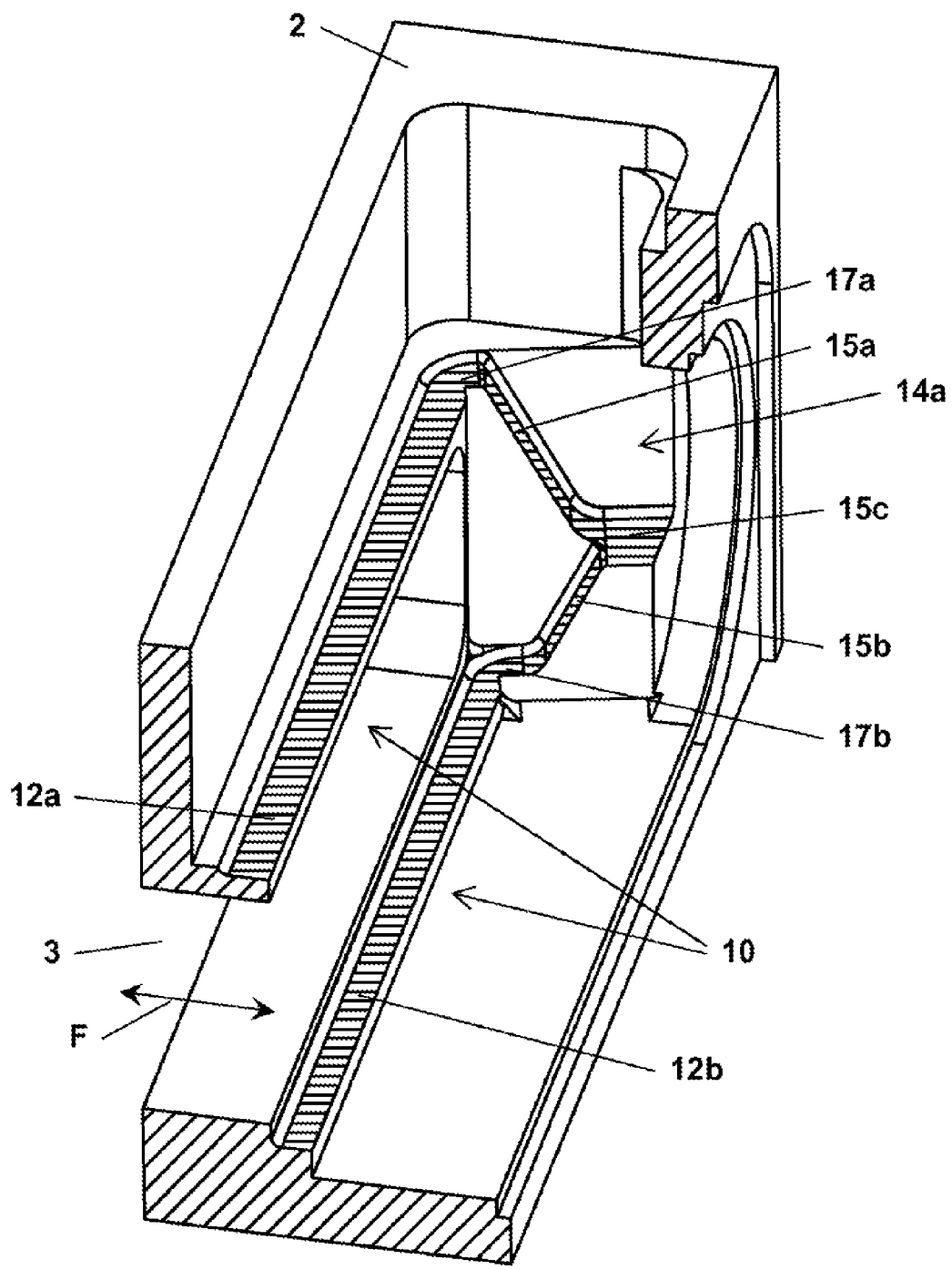
FIG. 1a shows an oblique view of a half section of a valve housing of a first embodiment of the vacuum valve.
Figure 1B:
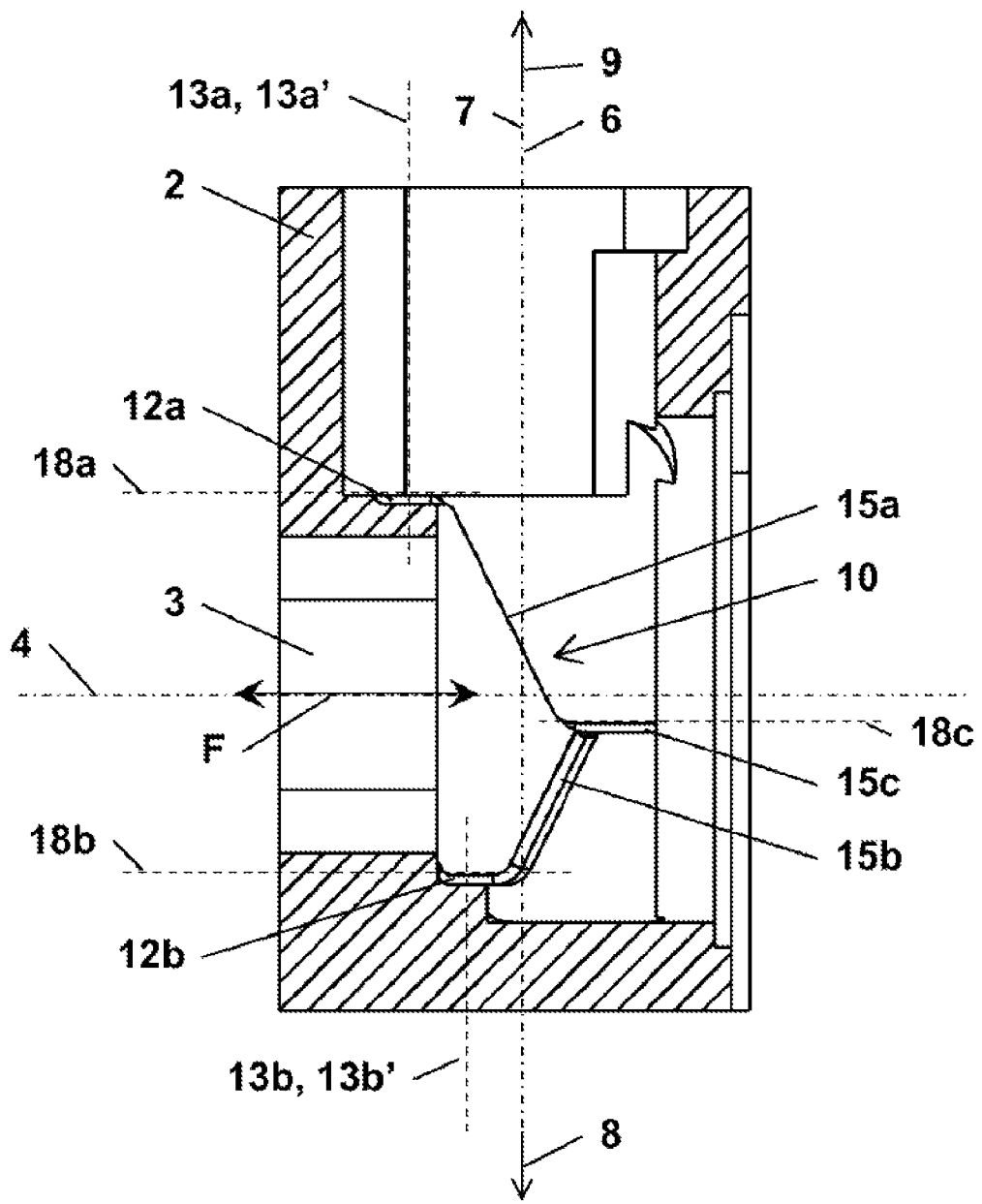
FIG. 1b shows a lateral cross section of the valve housing.
Figure 2E:
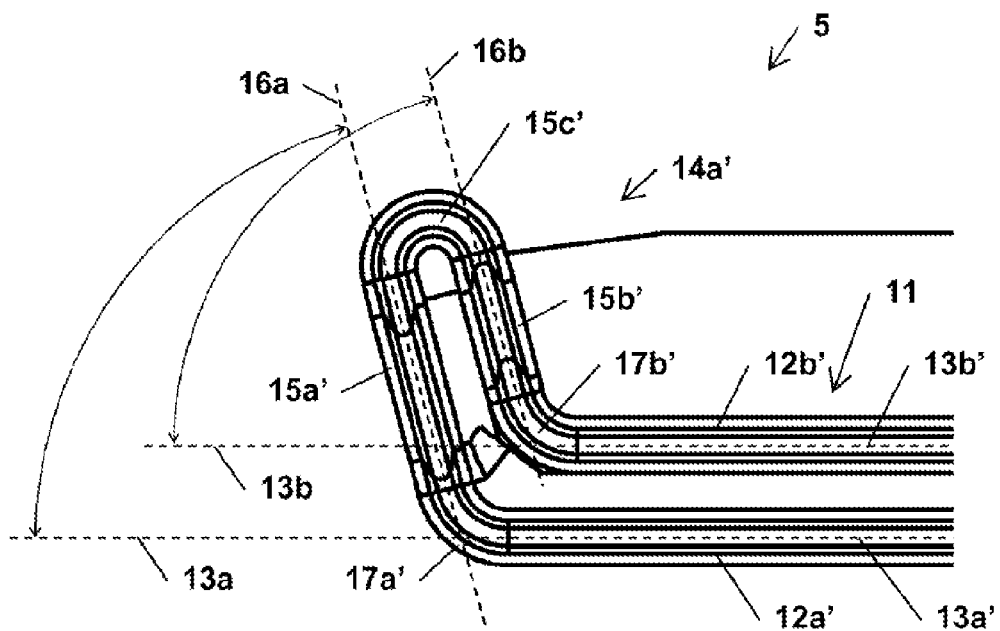
FIG. 2e shows a top view of a detail of a portion of the closure member.
Figure 2F:
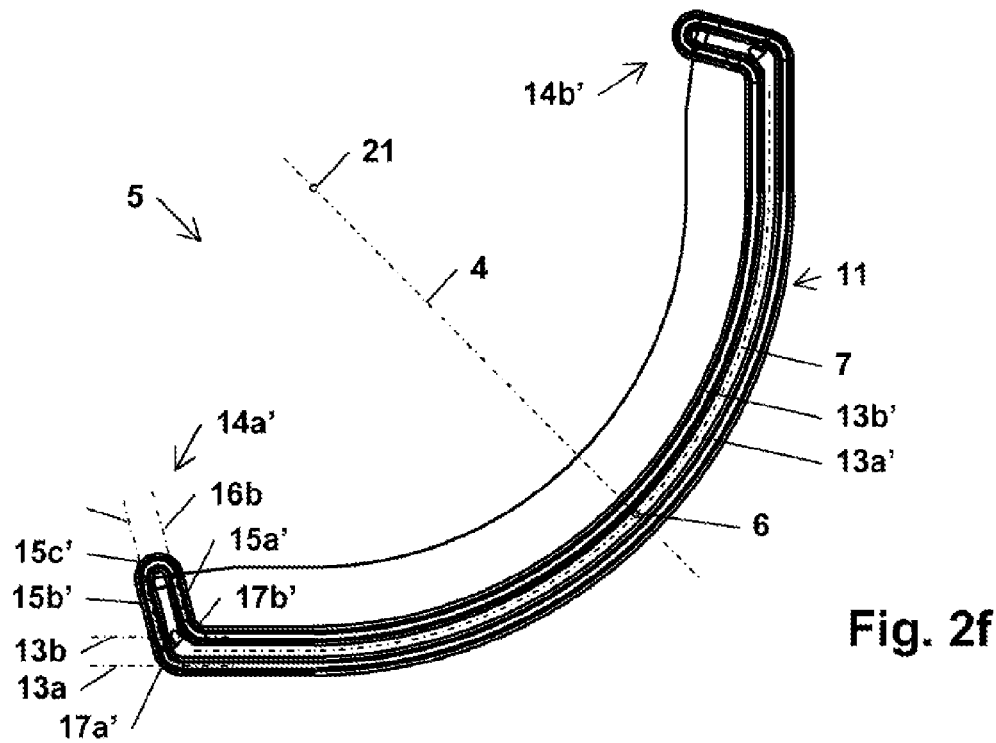
FIG. 2f shows a top view of a first curved variant of a closure member with a main face curved in a first direction.
Figure 2G:
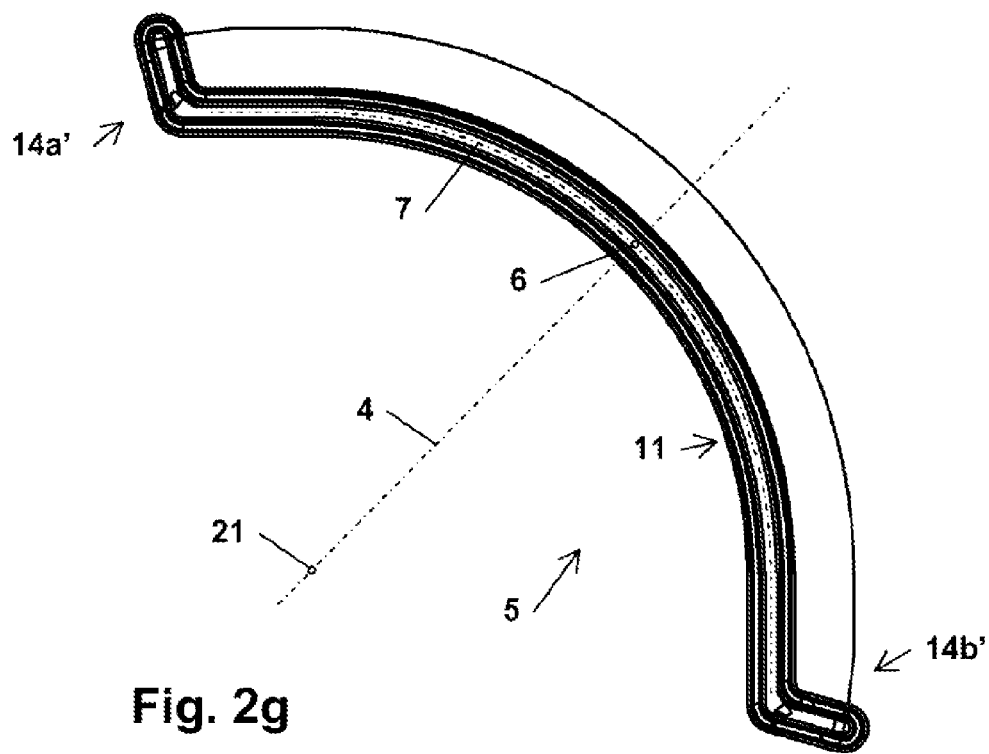
FIG. 2g shows a top view of a second curved variant of a closure member with main faces curved in a second direction.
Figure 3E:
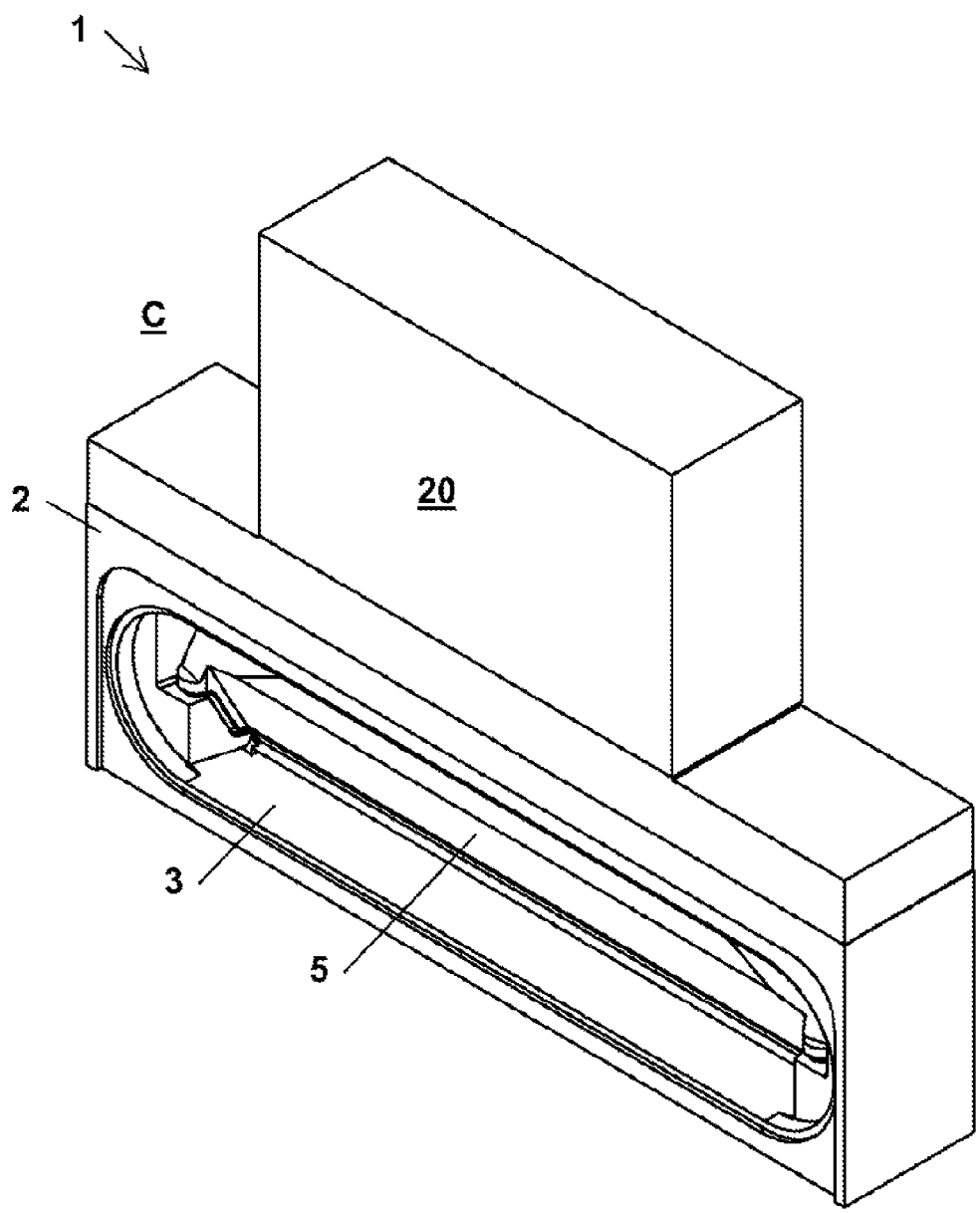
FIG. 3e shows an oblique view of the first embodiment of the vacuum valve as claimed in the invention with the closure member in the closed position.
Figure 5A:
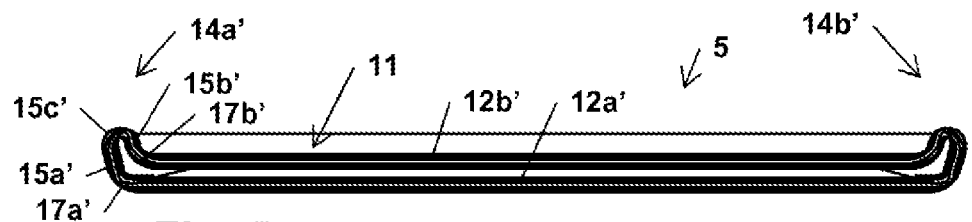
FIG. 5a shows a top view of a closure member as claimed in the invention of the second embodiment of the vacuum valve as claimed in the invention.
Figure 5B:
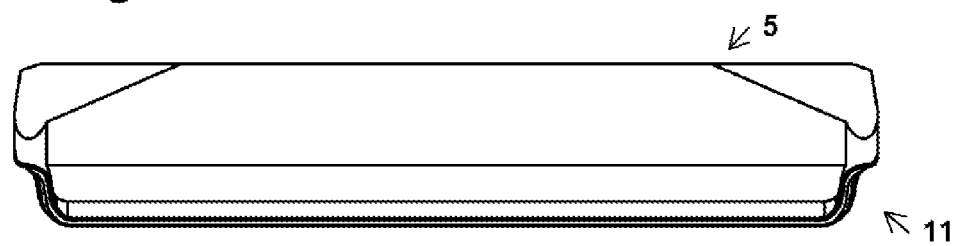
FIG. 5b shows a front view of the closure member.
Figure 5C:
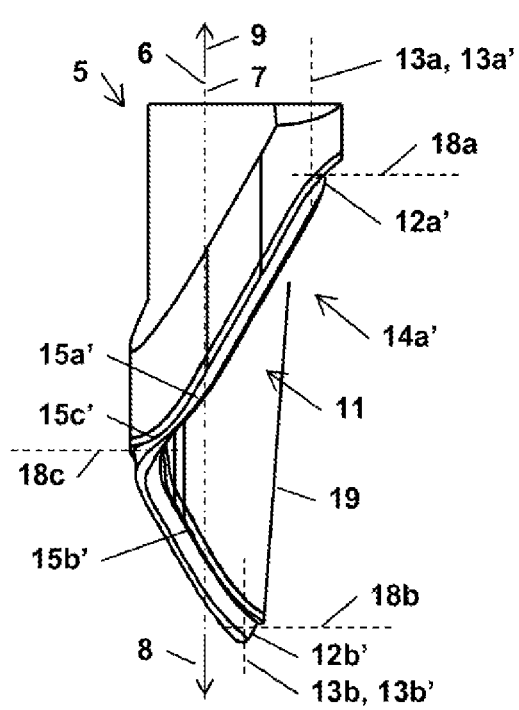
FIG. 5c shows a side view of the closure member.
Figure 5D:
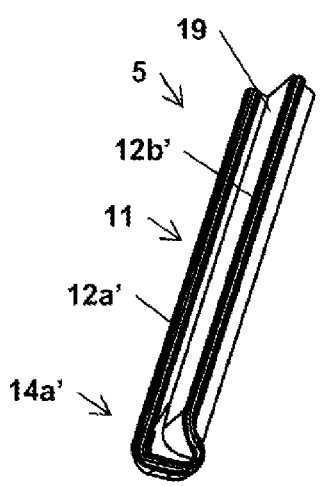
FIG. 5d shows an inclined view of the closure member.
Figure 5E:
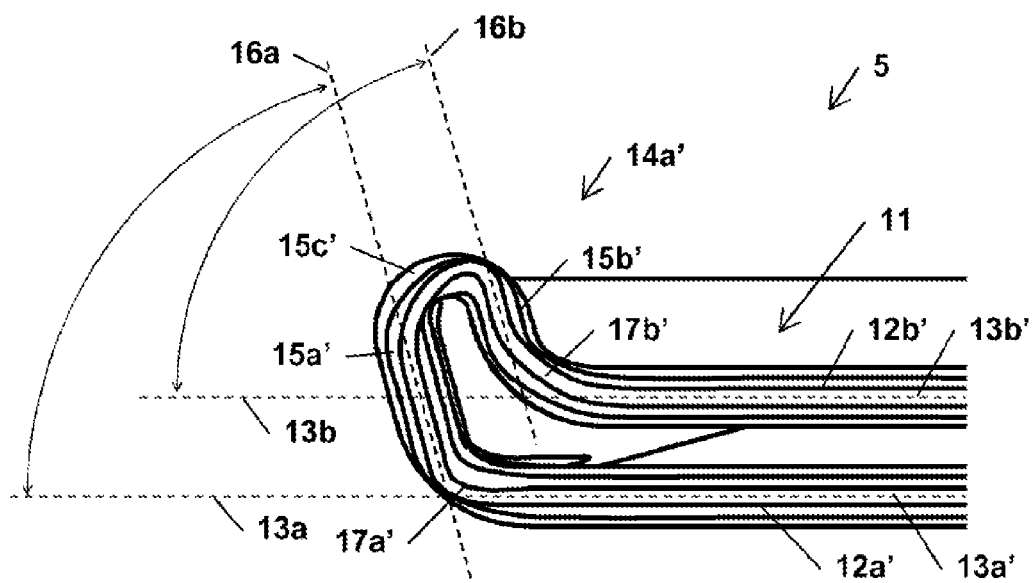
FIG. 5e shows a top view of a detail of a portion of the closure member.

FIGS. 1a to 2e and 3a to 3e show a first embodiment of the vacuum valve 1 and the closure member 5 thereof. By means of the vacuum valve 1, a flow path F, which leads through an opening 3 of a valve housing 2, can be closed in a gas-tight manner by means of a linear movement of the closure member 5. The opening 3 for the flow path F is formed in the valve housing 2 in the form of a rectangular passage, the width b of the opening 3 in the exemplary embodiment shown being approximately six times the height h of the opening 3, as shown in FIG. 3c. The vacuum valve 1 is realized as a transfer valve.

A geometric opening axis 4, which extends centrally along the development of the opening 3 through the valve housing 2, runs through the opening 3 along the flow path F, as shown in FIG. 1b. As shown in FIGS. 3a to 3e, the closure member 5 arranged in the valve housing 2 in the form of a valve disk is adjustable in a linear manner along a geometric adjustment axis 6. The adjustment axis 6 runs transversely, namely vertically with respect to the opening axis 4 in a closure member face 7 which is formed by a closure member plane and which is shown in FIGS. 1b and 2c by means of the dot-dash line. The closure member 5 is displaceable in a closing direction 8 in a linear manner along the adjustment axis 6 by means of a drive 20 from an open position O, in which the opening 3 is released, as shown in FIGS. 3c and 3d, into a closed position C pushed linearly over the opening 3, as illustrated in FIGS. 3a, 3b and 3e. By displacing the closure member 5 in a linear manner in the opposite opening direction 9, it can be displaced in a linear manner from the closed position C back into the open position O.

The opening 3 of the valve housing 2 is surrounded by an at least partially curved first sealing face 10 of the valve housing 2, as shown in FIG. 1a by way of the hatched face. The closure member 5 has a second sealing face 11 which corresponds with said first sealing face 10 and has a form that corresponds to the first sealing face 10, as shown in FIGS. 2a to 2e.

As shown in FIGS. 3a and 3b, there is gas-tight contact between the second sealing face 11 and the first sealing face 10 in the closed position C by the second sealing face 11 being pressed in the closing direction 8 onto their first sealing face 10 such that the closure member 5 closes the opening 3 in a gas-tight manner by way of its closure face 19. The sealing contact is made possible, for example, by one of the two sealing faces being realized as an elastic seal, for example an O-ring or a vulcanized seal, or carrying such a seal. Said seal can be arranged either on the closure member 5, as shown in the figures, or on the valve housing 2. In other words, either the first sealing face 10 can form the seal and the second sealing face 11 the valve seat on which the sealing face is able to rest in a gas-sealing manner, or vice versa. Various sealing materials and types of seal are known from the prior art and do not need to be explained further here.

The first sealing face 10 of the valve housing 2 is assembled from variously formed portions 12a, 12b, 14a, 14b, 17a, 17b which in each case are non-parallel to the adjustment axis 6, as explained below in more detail. The surface normals of all said portions 12a, 12b, 14a, 14b, 17a, 17b of the first sealing face 10 have directional components which are parallel in each case to the adjustment axis 6. Consequently, the first sealing face 10 points vertically or inclinedly in the opening direction 9, as can be seen in FIGS. 1a and 1b. Consequently, the entire first sealing face 10 points upward in the figures.

The second sealing face 11 of the closure member also has variously formed portions 12a', 12b', 14a', 14b', 17a', 17b' which in each case are non-parallel to the adjustment axis 6 and correspond to the portions 12a, 12b, 14a, 14b, 17a, 17b of the first sealing face 10, as shown in FIGS. 2a to 2e. The surface normals of said portions 12a', 12b', 14a', 14b', 17a', 17b' of the second sealing face 11 also have directional components which are parallel in each case to the adjustment axis 6 such that the second sealing face 11 points vertically or inclinedly in an opening direction 9 of the adjustment axis 6. The second sealing face 11 therefore points downward in the exemplary embodiment shown.

The first sealing face 10 is assembled along its development from a first main portion 12a, a first curvature portion 17a, a first U-shaped side portion 14a which in turn includes a first leg 15a, a base 15c and a second leg 15b, a second curvature portion 17b, a second main portion 12b, a further second curvature portion 17b, a second U-shaped side portion 14b which in turn includes a second leg 15b, a base 15c and a first leg 15a, and a further first curvature portion 17a which in turn is connected to the other end of the first main portion 12a, as shown in FIG. 1a.

Corresponding to the first sealing face 10, the second sealing face 11 of the closure member 5 is also assembled along its development from a first main portion 12a', a first curvature portion 17a', a first U-shaped side portion 14a' which in turn includes a first leg 15a', a base 15c' and a second leg 15b', a second curvature portion 17b', a second main portion 12b', a further second curvature portion 17b', a second U-shaped side portion 14b' which in turn includes a second leg 15b', a base 15c' and a first leg 15a', and a further first curvature portion 17a' which in turn is connected to the other end of the first main portion 12a', as shown in FIGS. 2a to 2e. As the portions correspond to one another, only the portions of the first sealing face 10 are explained more precisely in part below.

The first main portion 12a of the first sealing face 10 and the first main portion 12a of the second sealing face 11 extend substantially along a geometric flat first main face 13a', as shown in FIG. 1b or 2c and 2e. The second main portion 12b of the first sealing face 10 and the second main portion 12b' of the second sealing face 11 also extend substantially along a geometric flat second main face 13b'. The first main face 13a' and the second main face 13b' lie parallel to one another and at a spacing from one another. They extend parallel to the flat closure member face 7. The first main portion 12a or 12a' and the opposite second main portion 12b or 12b' have, with respect to one another, a geometric offset transversely with respect to the adjustment axis 6, as shown in FIGS. 1a and 1b or 2a, 2c, 2d and 2e. The opening 3, FIG. 1a, lies between the two opposite main portions 12a and 12b of the first sealing face 10 and the closure face 19 of the closure member 5, FIGS. 2c and 2d, lie between the two opposite main portions 12a' and 12b' of the second sealing face 11.

The lateral first U-shaped side portion 14a of the first sealing face 10 or the lateral first U-shaped side portion 14a' of the second sealing face 11 connects the first main portion 12a or 12a' and the second main portion 12b or 12b' on the one side of the respective sealing face 10 or 11, whilst the lateral second U-shaped side portion 14b of the first sealing face 10 or the lateral second U-shaped side portion 14b' of the second sealing face 11 connects the first main portion 12a or 12a' and the second main portion 12b or 12b' on the one side of the respective sealing face 10 or 11, as shown in FIG. 1a or 2a.

The first U-shaped side portion 14a or 14a' and the second U-shaped side portion 14b or 14b' have in each case the first leg 15a or 15a' which is associated with the first main portion 12a or 12a' and the second leg 15b or 15b' which is associated the second main portion 12b or 12b' as well as the base 15c or 15c' which is realized as an arc. The two first legs 15a or 15a' on the one side and the other side of the respective sealing face extend in each case substantially along to first leg planes 16a which lie parallel to the adjustment axis 6. One of the two first leg planes 16a is shown in FIG. 2e in the form of the broken line.

The two second legs 15b or 15b' also extend substantially along second leg planes 16b which extend parallel to the adjustment axis 6, as is also shown in FIG. 2e. As can be seen there, the first leg plane 16a and the second leg plane 16b both of the first U-shaped side portion 14a or 14a' and of the second U-shaped side portion 14b or 14b' extend substantially parallel to one another. The first leg 15a or 15a' and the second leg 15b or 15b' consequently have, with respect to one another, a geometric offset transversely with respect to the adjustment axis 6. The respective arcuate base 15c or 15c' in each case connects the first leg 15a or 15a' and the second leg 15b or 15b' together and bridges the geometric offset transversely with respect to the adjustment axis 6.

The first curvature portion 17a or 17a' of the first sealing face 10 or of the second sealing face 11 is arranged in each case between the first main portion 12a or 12a' and the two first legs 15a or 15a'. The first sealing face 10 or the second sealing face 11, which extend in the first main portion 12a or 12a' along the first main face 13a', in each case merge into the first curvature portions 17a or 17a', the respective transition from the first main portion 12a or 12a' into the respective first curvature portion 17a or 17a' being effected at both ends of the first main portion 12a or 12a' in each case in a geometric first tangential plane 13a to the first main face 13a'. The two first leg planes 16a are in each case angled by at least 15 degrees, namely in the exemplary embodiment shown by 70 degrees in relation to the respective first tangential plane, as shown in particular in FIGS. 2a and 2e. In said respective first curvature portion 17a or 17a' which in the exemplary embodiment shown is arcuate, the sealing face 10 or 11, which extends in the first main portion 12a or 12a' along the first main face 13a', is guided out of the first main face 13a' by in excess of 15 degrees, namely in the exemplary embodiment shown by the named 70 degrees by means of a geometric curvature and merges into the first leg plane 16a, as illustrated in FIG. 2e. The second curvature portion 17b or 17b' of the first sealing face 10 or the second sealing face 11 is also arranged in each case between the second main portion 12b or 12b' and the two second legs 15b or 15'. The first or second sealing face 10 or 11, which extends in the second main portion 12b or 12b' along the second main face 13b', merges in each case at the ends of the second main portion 12b or 12b' into the second curvature portions 17b or 17b', the respective transition from the second main portion 12b or 12b' in the respective second curvature portion 17b or 17b' being effected in each case in a geometric second tangential plane 13b to the second main face 13b'. The two second leg planes 16b are angled in each case by in excessive of 15 degrees, namely by 70 degrees in relation to the respective second tangential plane 13b. The sealing face 10 or 11, which extends in the second main portion 12b or 12b' along the second main face 13b, is consequently guided out of the second main face 13b' by the named 70 degrees by means of the geometric curvature such that the sealing face 10 or 11 merges into the second leg plane 16b.

FIG. 2e illustrates the respective pivot angle by way of the curved angle arrows. In other words, the side portions 14a, 14a', 14b, 14b' are pivoted inward toward one another in each case by approximately 70 degrees in each case about a geometric pivot axis which extends parallel to the adjustment axis 6, as is shown, for example, in FIG. 2a.

In the exemplary embodiment which is shown in FIGS. 1a to 2e, 3a to 3e and FIGS. 4a to 5e, the first main face 13a', the second main face 13b' and the closure member face 7 are formed by three parallel planes, which is why the two first tangential planes 13a coincide with the first main face 13a' and the two second tangential planes 13b coincide with the second main face 13b', as is shown in FIGS. 1b, 2c and 2e. A variant of the invention, however, provides that the first main face 13a', the second main face 13b' and the closure member face 7 are curved at least in a part portion about an axis of curvature 21 which is substantially parallel to the adjustment axis 6, as shown in FIGS. 2f and 2g in a top view of a closure member. In contrast to the preceding exemplary embodiment, here the tangential planes 13a or 13b and the associated main face 13a' or 13b' do not lie one on top of the other as the main faces 13a' or 13b' are not planes but lateral cylinder surface portions which are curved about an axis of curvature 21 in a part portion, as shown in FIGS. 2f and 2g. In the two variants shown, the opening axis 4 and the axis of curvature 21 intersect at an angle of intersection of 90 degrees. In addition, the opening axis 4 and the adjustment axis 6 intersect at an angle of intersection of 90 degrees, the adjustment axis 6 and the axis of curvature 21 extending parallel to one another. In the variant shown in FIG. 2f, the legs 15a' and 15b' are pivoted to that side in which the main faces 13a' and 13b' are curved and on which the axis of curvature 21 lies. However, in the variant shown in FIG. 2g, the legs 15a' and 15b' are pivoted onto that side which is opposite the side on which the main faces 13a' and 13b' are curved and on which the axis of curvature 21 lies. The transition of the second sealing face 11 from the first main portion 12a' into the first curvature portion 17a out of the first main face 13a' is effected in each case in the first tangential plane 13a, whilst the transition of the second sealing face 11 from the second main portion 12b' into the second curvature portion 17b out of the second main face 13b' takes place in each case in the second tangential plane 13b, as is shown in FIG. 2f. The angle of curvature is produced in the present example from the angle of intersection of the two first tangential planes and the angle of intersection of the two second tangential planes. In the present case, said two angles of intersection are identical and are 90 degrees. However, it is also possible for the angles of intersection to be variously large. The remaining features of the variants shown in FIGS. 2f and 2g, in particular the features of the first U-shaped side portion 14a' and of the second U-shaped side portion 14b' correspond to those of the preceding exemplary embodiment and do not need to be explained separately. The features of the second sealing face 11 of the closure member 5 shown in conjunction with FIGS. 2f and 2g correspond to the features of the first sealing face 10 of the valve housing 2 which correspond with the second sealing face 11 and are correspondingly transferable, which is why a separate explanation of said corresponding features can be omitted.

Common to the variants shown is that the first and second main portions 12a, 12a', 12b and 12b' have in each case with respect to one another not only a geometric offset transversely with respect to the adjustment axis 6, which is bridged by means of the U-shaped side portions 14a, 14a', 14b and 14b', in the special case by means of the bases 15c or 15c', but also a geometric offset in the direction parallel to the adjustment axis 6. The opening 3 or the closure face 19 extends in this region. The bridging of said region is described below.

In the case of the exemplary embodiment according to FIGS. 1a to 2e, 3a to 3e and FIGS. 4a to 5e, the first main portion 12a or 12a' extends in a straight line and in the case of the variants according to FIGS. 2f and 2g it extends in a curved manner on a first horizontal plane 18a to which the adjustment axis 6 forms a surface normal, as is shown in FIG. 1b or 2c. In the case of the exemplary embodiment according to FIGS. 1a to 2e, 3a to 3e and FIGS. 4a to 5e, the first main portion 12b or 12b' also extends in a straight line and in the case of the variants according to FIGS. 2f and 2g it extends in a curved manner on a second horizontal plane 18b to which the adjustment axis 6 also forms a surface normal. The first horizontal plane 18a and the second horizontal plane 18b are parallel to one another and spaced apart from one another, FIG. 1b or 2c. The two first legs 15a or 15a', the two second legs 15b or 15b' and the two bases 15c or 15c' extend between the first horizontal plane 18a and the second horizontal plane 18b. The two bases 15c or 15c' which are realized as arcs are located on a common third horizontal plane 18c which extends centrally between the first horizontal plane 18a and the second horizontal plane 18b. The adjustment axis 6 also forms a surface normal to the third horizontal plane 18c. The three horizontal planes 18a, 18b and 18c are parallel.

The two first curvature portions 17a or 17a' also lie on the first horizontal plane 18a. In addition, the two second curvature portions 17b or 17b' extend on the second horizontal plane 18b, as shown in FIGS. 1a and 1b or 2c and 2d. In the first exemplary embodiment, therefore, apart from the legs 15a and 15b or 15a' and 15b' all of the portions of the sealing faces 10 or 11 extend on horizontal planes 18a, 18b and 18c and are not able to bridge the offset in the direction parallel to the adjustment axis 6. Consequently, the two first legs 15a or 15a' and the two second legs 15b or 15b' extend inclinedly in the direction of the adjustment axis 6 and consequently bridge the spacing between the first horizontal plane 18a and the second horizontal plane 18b, as can be seen in FIGS. 1a and 1b or 2b and 2d. Said bridging is particularly critical in the direction parallel to the adjustment axis 6 with regard to the load on the seal as the seal, when pressed in the closed position C, in said portion in contrast to all the other portions which extend in horizontal planes 18a, 18b and 18c, is not only loaded vertically but when the seal is pressed is also loaded in the longitudinal direction. The load in the longitudinal direction is certainly less critical than a load in the transverse direction, which in the case of the seal geometry as claimed in the invention is completely avoidable, however an excessive longitudinal load should be avoided. The angle of bridging, consequently, should not be too steep. As a result of the angled side portions, said angle can be relatively small in the direction of the adjustment axis 6, as is shown in FIGS. 1b and 2c. As a result, the longitudinal extension of said transition region is certainly enlarged, however this only has a slight effect on the width of the vacuum valve, as is also shown in FIG. 2a, as the transition region extends above all in the direction parallel to the opening axis 4 as a result of pivoted-in side portions. Consequently, the vacuum valve 1 and the closure member 5 do become somewhat deeper, however narrower in relation to the opening width b. As a result of the seal geometry increasing in depth, an increase in the rigidity of the vacuum valve 1 and of the closure member 5 thereof is achieved.

Whilst in the case of the first exemplary embodiment the curvature portions 17a, 17a', 17b and 17b' and the bases 15c and 15c' lie on the horizontal planes 18a, 18b or 18c, consequently do not extend parallel to the adjustment axis 6 and do not bridge the spacing between the main portions 12a and 12b or 12a' and 12b' in the direction parallel to the adjustment axis 6, in the second exemplary embodiment according to FIGS. 4a to 5e said portions also extend in the direction parallel to the adjustment axis 6. As is shown in FIGS. 4a and 4b or 5c and 5d, the two bases 15c partially bridge the spacing between the first horizontal plane 18a and the second horizontal plane 18b by being realized in each case as a segment of a helix which extends substantially parallel to the adjustment axis 6. The bases 15c or 15c' merge into the legs 15a, 15a', 15b or 15b' which are realized as lightly rotated and twisted straight lines, FIG. 5e. The first legs 15a or 15a' merge into the two first curvature portions 17a or 17a' which extend between the first horizontal plane 18a and the third horizontal plane 18c, whilst the second legs 15b or 15b' merge into the two second curvature portions 17b or 17b' which extend between the second horizontal plane 18b and the third horizontal plane 18c, as illustrated in FIGS. 4b and 5c. The two first curvature portions 17a or 17a' and the two second curvature portions 17b or 17b' are realized in each case as a segment of a helix which extends substantially parallel to the adjustment axis 6, as shown in FIGS. 4a, 4b, 5a, 5b, 5c, 5d and 5e. Consequently, the two first curvature portions 17a or 17a' and the two second curvature portions 17b or 17b' partially bridge the spacing between the first horizontal plane 18a and the second horizontal plane 18b and between the first main portion 12a or 12a' and the second main portion 12b or 12b'. The remaining features of the second exemplary embodiment correspond substantially to those of the first exemplary embodiment, which is why reference is made to the corresponding statements above.

FIGS. 6a to 7e show variants of the second exemplary embodiment from FIGS. 4a to 5e which are further developed as claimed in the first aspect of the invention. In part, purely the features which differ from the preceding exemplary embodiments are detailed below.

The vacuum valve 1 according to FIGS. 6a to 7e has, just as the preceding exemplary embodiments also, the valve housing 2 with the opening 3 for the flow path F and the geometric opening axis 4. The closure member 5 is displaceable in a closing direction 8 in a linear manner along the geometric adjustment axis 6, which extends transversely with respect to the opening axis 4, in the closure member face 7 from an open position O which releases the opening 3, compare FIG. 4a, into the closed position C pushed linearly over the opening 3 and is displaceable in reverse back in the opening direction 9. The valve housing 2 has the at least partially curved first sealing face 10 which surrounds the opening 3. The second sealing face 11, which corresponds with the first sealing face 10 and has a form that corresponds with the first sealing face 10, is arranged on the closure member 5 in the form of a vulcanized elastic seal, as is shown in FIGS. 6a to 7e. The first sealing face 10 is assembled from variously formed portions which are in each case non-parallel to the adjustment axis 6 and point vertically or inclinedly in the opening direction 9. In the closed position C, the second sealing face 11 is in sealing contact, pressing onto the first sealing face 10 in the closing direction 8, with the first sealing face 10, as is shown in FIGS. 6a to 6f. The closure member 5 consequently closes the opening 3 in a gas-tight manner.

Common to the variants from FIGS. 6a to 7e is that the valve housing 2 has a first inclined face 22 which surrounds the opening 3 in a frame-like manner in a frame-shaped region between the opening 3 and the first sealing face 10. The closure member 5 has a second inclined face 23 which extends parallel to the first inclined face 22, corresponds with the first inclined face 22 and has a form that corresponds with the first inclined face 22. The first inclined face 22 and the second inclined face 23 are inclined in each case at an angle of inclination 24 in relation to the closure member face 7 in such a manner that the first inclined face 22 points inclinedly in the opening direction 9 and the second inclined face 23 points inclinedly in the closing direction 8. The first inclined face 22 and the second inclined face 23 are intersected in their geometric extensions, which are illustrated by way of the broken line, by the geometric adjustment axis 6 at the angle of inclination 24. The closure member face 7 is intersected by way of the first inclined face 22 and the second inclined face 23 in the lines of intersection 28, shown as a common line of intersection 28 as a result of the small spacing between the parallel inclined faces 22 and 23. Said lines of intersection 28 extend parallel to one another and are geometric straight lines as a result the flat development of the main faces. However, it is also possible for the main faces, as is shown in particular in FIGS. 2f and 2g, to be curved faces and consequently also the inclined faces 22 and 23, which, in the exemplary embodiment shown are geometric planes, to be formed by curved faces, in the latter case the lines of intersection 28 being curves.

In the exemplary embodiment shown, the angle of inclination 24 is approximately 5 degrees. In the variants according to FIGS. 6a to 7e, the first inclined face 22 and the second inclined face 23 lie in such a manner with respect to one another that, in the closed position C of the closure member 5, the second inclined face 23 is arranged in a parallel position opposite the first inclined face 22, the spacing v between the inclined faces 22 and 23 with respect to one another in the variant according to FIG. 6a being greater that 0.05 mm, but smaller than 0.6 mm, whilst the spacing v in the case of the variants according to FIGS. 6b to 6f being equal to 0 such that the two inclined faces touch one another.

Figure 6A:
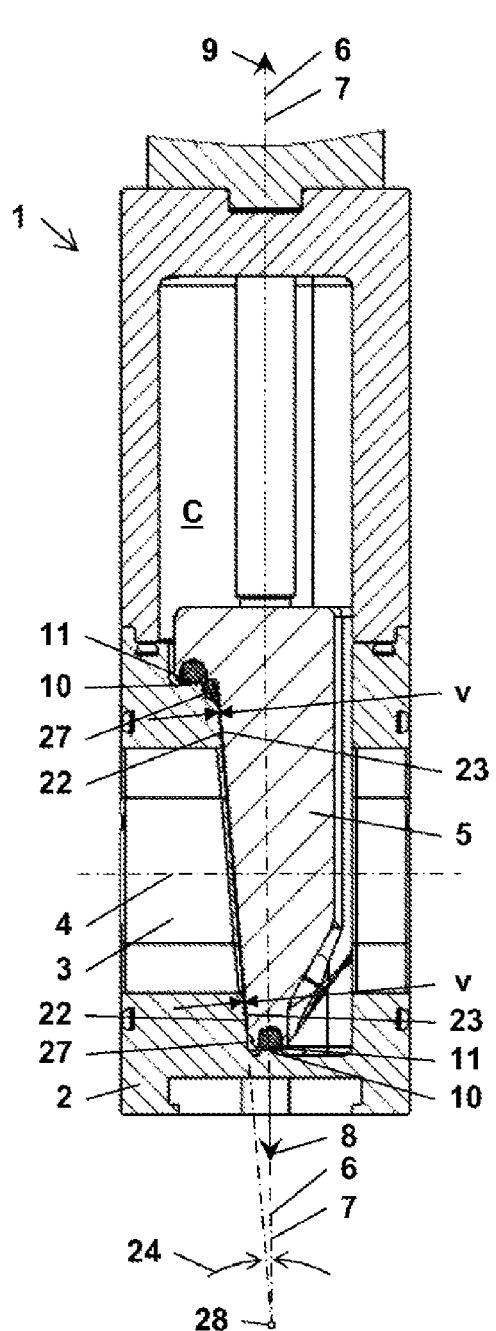
FIG. 6a shows a lateral cross section of a valve housing and a closure member with inclined faces in an embodiment without an additional elastic seal.

In the variant according to FIG. 6a, the first inclined face 22 and the second inclined face 23 are realized as non-elastic metal faces. The spacing v in the closed position C of the closure member 5 is between 0.05 mm and 0.6 mm, as illustrated in FIG. 6a, such that there is no contact between the inclined faces 22 and 23 and generation of friction particles is avoided. As a result of the small spacing v between the inclined faces 22 and 23 in the closed position C, said small gap acts as a barrier and prevents an aggressive medium from the region of the opening 4 directly contacting the sealing faces 10 or 11.

In order, additionally, to prevent the medium penetrating to the sealing faces 10 and 11, the valve housing 2 and the closure member 5 have in the region between the first inclined face 22 and the first sealing face 10, in the case of all the variants according to FIGS. 6a to 6f, a recess 27 which surrounds the first inclined face 22 and is arranged and developed in such a manner that the spacing z between the valve housing 2 and the closure member 5 is at least 0.8 mm, in particular between 0.8 mm and 6 mm, in the region of the recess 27. The influence of the medium on the second seal 11 is further reduced as a result of turbulence created in this manner should the medium penetrate into the gap between the inclined faces 22 and 23.

Figure 6B:
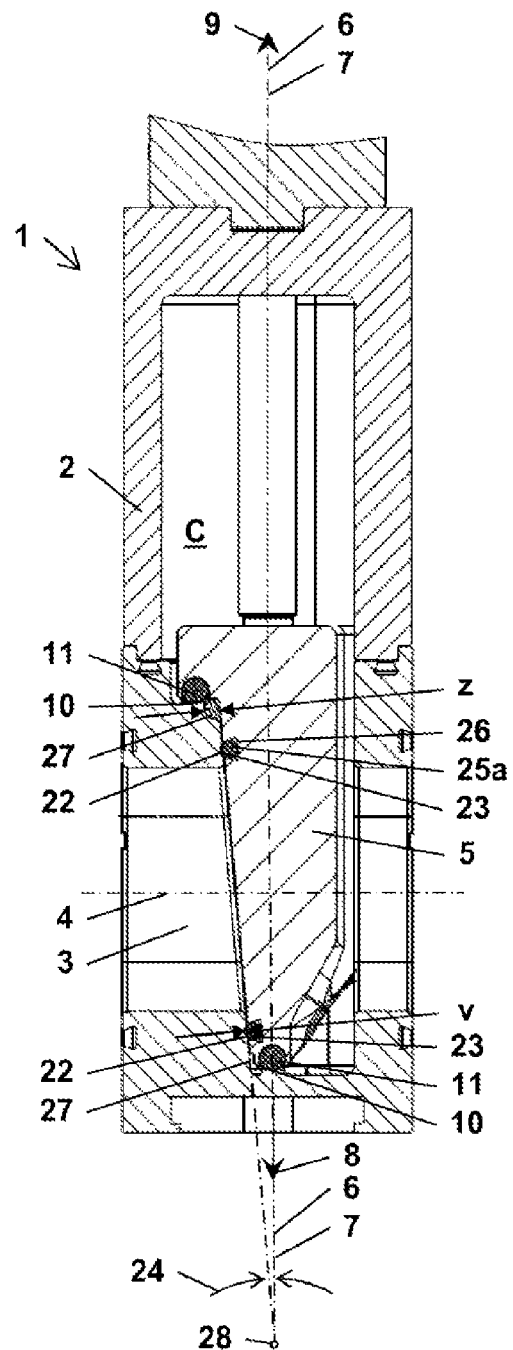
FIG. 6b shows a lateral cross section of a valve housing and a closure member with inclined faces in an embodiment with an O-ring with a circular cross section.
Figure 6C:
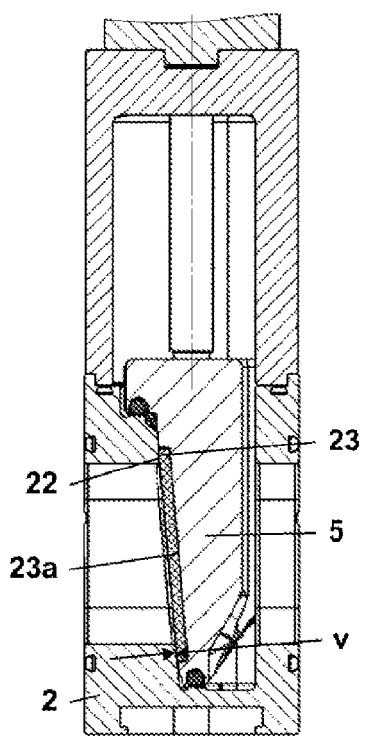
FIG. 6c shows a lateral cross section of a valve housing and a closure member with inclined faces in an embodiment with a protective shield.

FIG. 6c shows an embodiment with a high-frequency protective shield. The first inclined face 22 is realized as an electrically conducting metal face which is coupled with the valve housing 1 with regard to electric potential. The second inclined face 23 is a closed, electrically conducting protective shield 23a which, in the closed position C, fully covers the opening 3 and all around the opening 3 is connected electrically to the first inclined face 22 for potential electric coupling of the protective shield 23a with the valve housing 1, as is shown in FIG. 6c. To produce said electric contact, the spacing v in the closed position C is equal to 0 such that there is electric contact between the first inclined face 22 and the second inclined face 23.

Figure 6D:
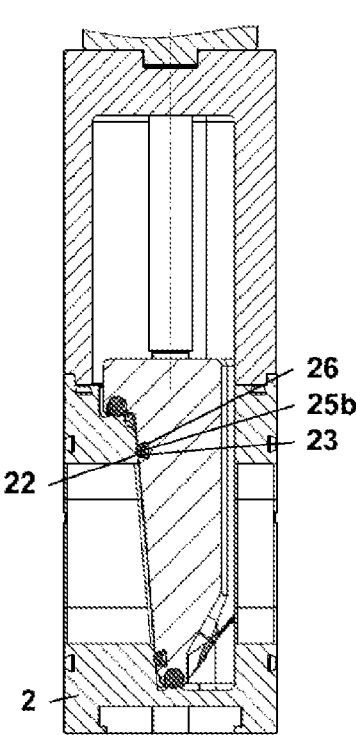
FIG. 6d shows a lateral cross section of a valve housing and a closure member with inclined faces in an embodiment with an O-ring with a kidney-shaped cross section.
Figure 6E:
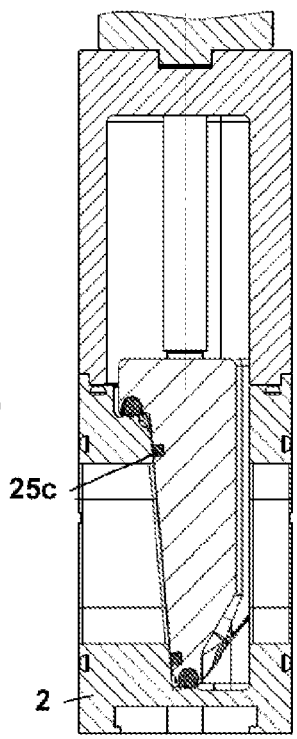
FIG. 6e shows a lateral cross section of a valve housing and a closure member with inclined faces in an embodiment with an O-ring with an X-shaped cross section.
Figure 6F:
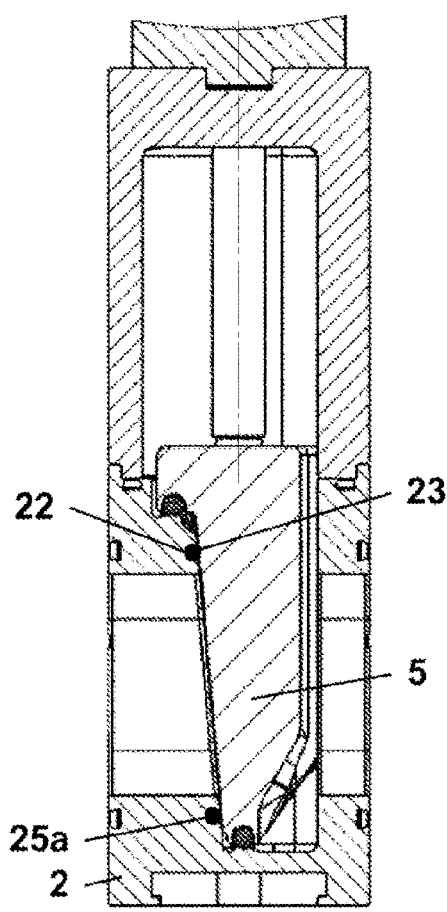
FIG. 6f shows a lateral cross section of a valve housing and a closure member with inclined faces in an embodiment with an O-ring with a circular cross section on the valve housing.
Figure 7A:
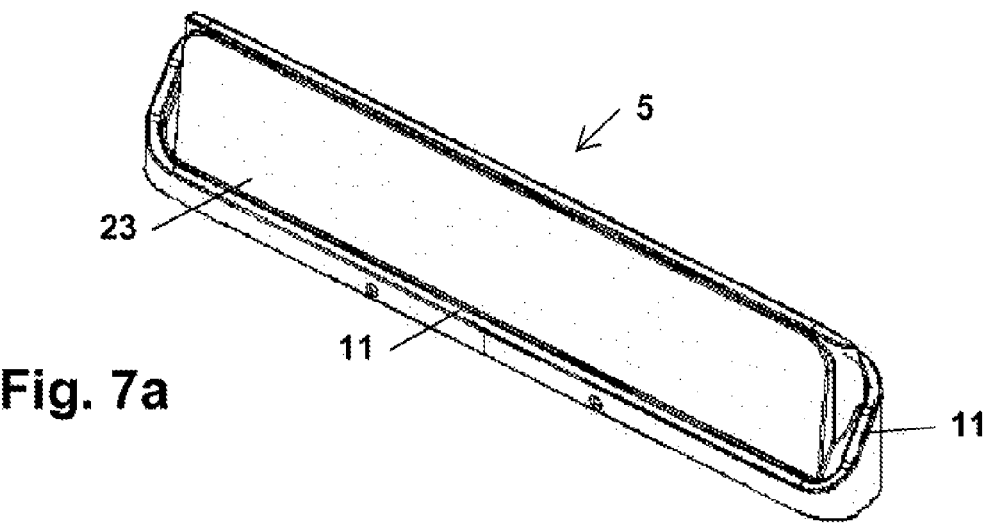
Figure 7B:
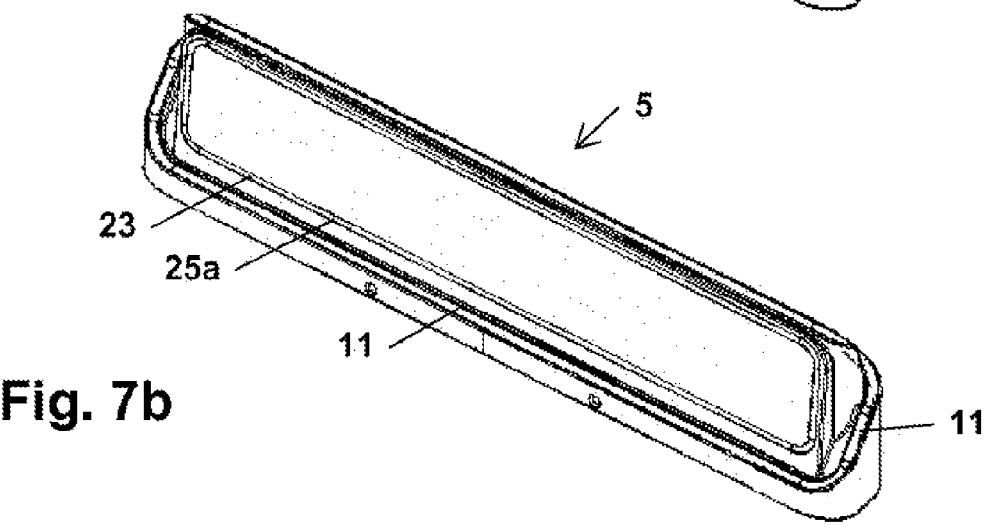
FIG. 7b shows an oblique view of the closure member from FIG. 6b.
Figure 7C:
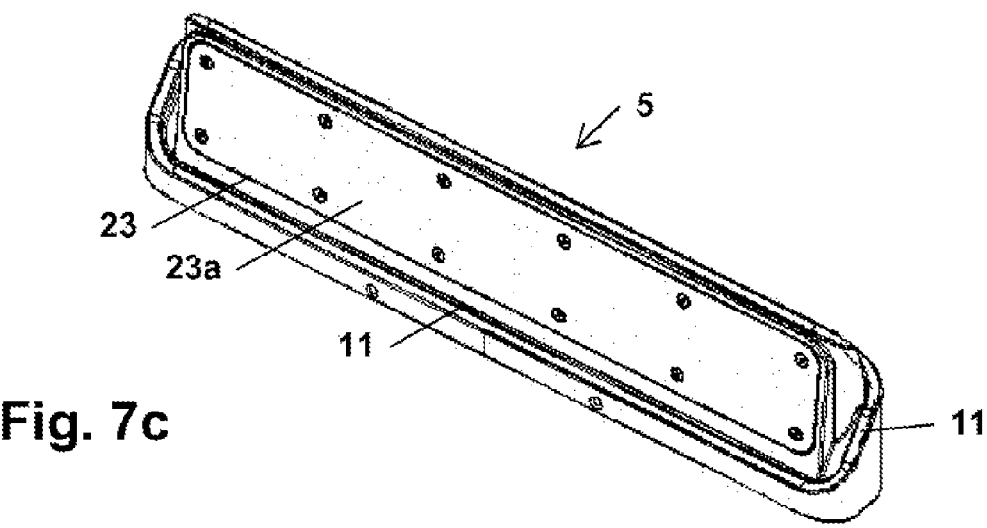
FIG. 7c shows an oblique view of the closure member from FIG. 6c.
Figure 7D:
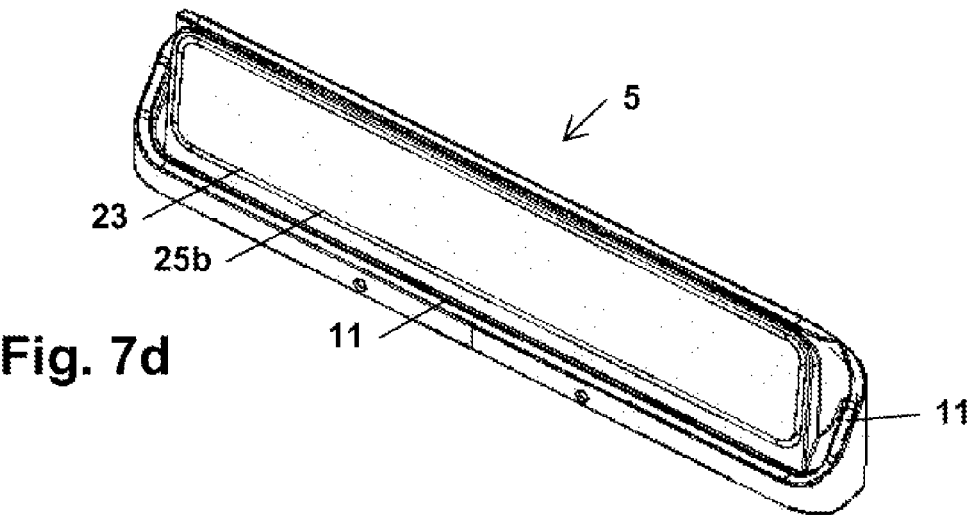
FIG. 7d shows an oblique view of the closure member from FIG. 6d.
Figure 7E:
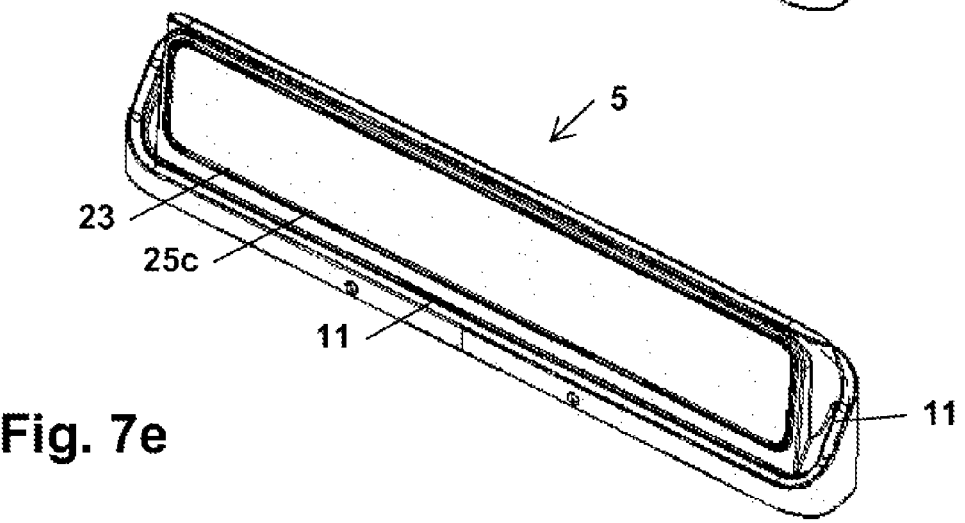
FIG. 7e shows an oblique view of the closure member from FIG. 6e.

In the case of the variants according to FIGS. 6b, 6d and 6e, the second inclined face 23 is formed in each case by an additional elastic seal 25a, 25b or 25c, whilst in the case of the variant according to FIG. 6f the first inclined face 22 is formed by the additional elastic seal 25a. The spacing v in the closed position C of the closure member 5 is in each case equal to 0 such that the additional elastic seal 25a, 25b or 25c touches the respectively opposite inclined face 22 or 23 in a sealing manner. Consequently, the first and second sealing face 10 and 11 are extensively isolated from the medium present in the region of the opening 3. The additional elastic seal 25a from FIG. 6b or FIG. 6f is formed by an O-ring 25a with a circular cross section which is arranged in a groove 26, whilst the cross section of the O-ring 25b from FIG. 6d is kidney-shaped and the cross section of the O-ring 25c from FIG. 6e is X-shaped. As an alternative to this, it is possible for the additional elastic seal 25a, 25b, 25c to be formed by a seal which is vulcanized on the valve house 2 and/or on the closure member 5.

Obviously it is possible to combine the individual specific features of the two aspects of the invention and of the individual exemplary embodiments together. In addition, it is possible to combine the features of the second exemplary embodiment with those of the first exemplary embodiment and of the two variants thereof of a curved basic cross section, and vice versa, and, for example, to realize simply one or several of the bases and/or one or several of the first curvature portions as bridging portions, in particular in the form of a segment of a helix. In place of a curved or helix geometry, other two-dimensionally or two-dimensionally extending geometries which are functionally equal to the described geometries are also included by the invention. In addition, it is possible to combine said combinations with the features of the variants of the inclined faces.

The invention claimed is:

1. A vacuum valve for closing a flow path in a gas-tight manner by means of a linear movement, said vacuum valve comprising:
   a valve housing with an opening for the flow path, wherein the opening has a geometric opening axis along the flow path;
   a closure member which is displaceable in a closing direction in a linear manner along a geometric adjustment axis, which extends transversely with respect to the geometric opening axis, in a closure member face from an open position which releases the opening into a closed position pushed linearly over the opening and is displaceable in reverse back in an opening direction;
   a first sealing face of the valve housing which surrounds the opening and is at least partially curved; and
   a second sealing face of the closure member which corresponds with the first sealing face and has a form that corresponds with the first sealing face, wherein:
      the first sealing face is assembled from variously formed portions which are in each case non-parallel to the adjustment axis;
      surface normals of the portions of the first sealing face have directional components which are in each case parallel to the adjustment axis and consequently the first sealing face points vertically or inclinedly in the opening direction;
      a first main portion of the first sealing face extends substantially along a geometric first main face;

a second main portion of the first sealing face extends substantially along a geometric second main face;
the first main face and the second main face extend parallel to the adjustment axis, are spaced apart from one another and extend substantially parallel to the closure member face and consequently the first main portion and the second main portion have, with respect to one another, a geometric offset transversely with respect to the adjustment axis;
the opening is arranged between the first and second main portions;
a lateral first U-shaped side portion of the first sealing face connects the first main portion and the second main portion on one side of the first sealing face;
a lateral second U-shaped side portion of the first sealing face connects the first main portion and the second main portion on another side of the first sealing face;
the lateral first U-shaped side portion and the lateral second U-shaped side portion have in each case a first leg which is associated with the first main portion, a second leg which is associated with the second main portion and a base;
the first leg and the second leg have, with respect to one another, a geometric offset transversely with respect to the adjustment axis;
the base connects in each case the first leg and the second leg and bridges the geometric offset transversely with respect to the adjustment axis;
in the closed position, the second sealing face is in sealing contact, pressing onto the first sealing face in the closing direction, with the first sealing face and the closure member closing the opening in a gas-tight manner;
the valve housing has a first inclined face which surrounds the opening in the region between the opening and the first sealing face;
the closure member has a second inclined face which extends parallel to the first inclined face, corresponds with the first inclined face and has a form that corresponds to the first inclined face;
the first inclined face and the second inclined face are in each case inclined at an angle of inclination in relation to the closure member face in such a manner that the first inclined face points inclinedly in the opening direction and the first inclined face and the second inclined face are intersected in their geometric extensions by the geometric adjustment axis at the angle of inclination;
the angle of inclination is between 3 and 15 degrees; and
the first inclined face and the second inclined face are configured in a non-elastic manner and located with respect to one another in such a manner that, in the closed position of the closure member, the second inclined face is arranged in a parallel position opposite the first inclined face with a spacing between one another in a range from between 0.05 and 0.6 mm.

2. The vacuum valve as claimed in claim 1, wherein:
the spacing in the closed position of the closure member is from between 0.05 mm and 0.3 mm.

3. The vacuum valve as claimed in claim 1, wherein:
the first inclined face and the second inclined face comprise metal faces.

4. A vacuum valve for closing a flow path in a gas-tight manner by means of a linear movement, said vacuum valve comprising:

a valve housing with an opening for the flow path, wherein the opening has a geometric opening axis along the flow path;
a closure member which is displaceable in a closing direction in a linear manner along a geometric adjustment axis, which extends transversely with respect to the geometric opening axis, in a closure member face from an open position which releases the opening into a closed position pushed linearly over the opening and is displaceable in reverse back in an opening direction;
a first sealing face of the valve housing which surrounds the opening and is at least partially curved; and
a second sealing face of the closure member which corresponds with the first sealing face and has a form that corresponds with the first sealing face, wherein:
the first sealing face is assembled from variously formed portions which are in each case non-parallel to the adjustment axis;
surface normals of the portions of the first sealing face have directional components which are in each case parallel to the adjustment axis and consequently the first sealing face points vertically or inclinedly in the opening direction;
a first main portion of the first sealing face extends substantially along a geometric first main face;
a second main portion of the first sealing face extends substantially along a geometric second main face;
the first main face and the second main face extend parallel to the adjustment axis, are spaced apart from one another and extend substantially parallel to the closure member face and consequently the first main portion and the second main portion have, with respect to one another, a geometric offset transversely with respect to the adjustment axis;
the opening is arranged between the first and second main portions;
a lateral first U-shaped side portion of the first sealing face connects the first main portion and the second main portion on one side of the first sealing face;
a lateral second U-shaped side portion of the first sealing face connects the first main portion and the second main portion on another side of the first sealing face;
the lateral first U-shaped side portion and the lateral second U-shaped side portion have in each case a first leg which is associated with the first main portion, a second leg which is associated with the second main portion and a base;
the first leg and the second leg have, with respect to one another, a geometric offset transversely with respect to the adjustment axis;
the base connects in each case the first leg and the second leg and bridges the geometric offset transversely with respect to the adjustment axis;
in the closed position, the second sealing face is in sealing contact, pressing onto the first sealing face in the closing direction, with the first sealing face and the closure member closing the opening in a gas-tight manner;
the valve housing has a first inclined face which surrounds the opening in the region between the opening and the first sealing face;
the closure member has a second inclined face which extends parallel to the first inclined face, corresponds with the first inclined face and has a form that corresponds to the first inclined face;

the first inclined face and the second inclined face are in each case inclined at an angle of inclination in relation to the closure member face in such a manner that the first inclined face points inclinedly in the opening direction and the first inclined face and the second inclined face are intersected in their geometric extensions by the geometric adjustment axis at the angle of inclination;

the angle of inclination is between 3 and 15 degrees; and the first inclined face and the second inclined face are located with respect to one another in such a manner that, in the closed position of the closure member, the second inclined face is arranged in a parallel position opposite the first inclined face with a spacing between one another in a range from between 0 and 0.6 mm;

wherein:

the first leg of the first lateral U-shaped side portion and the first leg of the second lateral U-shaped side portion extend in each case substantially along first leg planes which are parallel to the adjustment axis;

the second leg of the first lateral U-shaped side portion and the second leg of the second lateral U-shaped side portion extend substantially along second leg planes which are parallel to the adjustment axis;

the first main face, the second main face, the closure member face, the first inclined face and the second inclined face are formed in each case by geometric planes; and the first leg planes lie on the geometric plane of the first main face and the second leg planes lie on the geometric plane of the second main face.

5. The vacuum valve as claimed in claim 4, wherein:

the first inclined face comprises an electrically conducting metal face which is coupled with the valve housing with regard to electric potential;

the second inclined face comprises a closed, electrically conducting protective shield which, in the closed position, substantially fully covers the opening and all around the opening is connected electrically to the first inclined face for potential electric coupling of the protective shield with the valve housing; and the spacing in the closed position is equal to 0 for producing the electric contact.

6. The vacuum valve as claimed in claim 4, wherein:

the first inclined face and/or the second inclined face is formed by an additional elastic seal; and the spacing in the closed position of the closure member is equal to 0.

7. The vacuum valve as claimed in claim 6, wherein:

the additional elastic seal is formed by an O-ring which is arranged in a groove.

8. The vacuum valve as claimed in claim 7, wherein:

said O-ring has a circular cross section, a kidney-shaped cross section or an X-shaped cross section.

9. The vacuum valve as claimed in claim 6, wherein:

the additional elastic seal is formed by a seal which is vulcanized on the valve housing and/or on the closure member.

10. The vacuum valve as claimed in claim 4, wherein:

the valve housing and/or the closure member has in the region between the first inclined face and the first sealing face a recess which surrounds the first inclined face and is arranged and developed in such a manner that the spacing between the valve housing and the closure member is at least 0.8 mm in the region of the recess.

11. The vacuum valve as claimed in claim 10, wherein:

the spacing between the valve housing and the closure member is from between 0.8 mm and 6 mm in the region of the recess.

12. A vacuum valve for closing a flow path in a gas-tight manner by means of a linear movement, said vacuum valve comprising:

a valve housing with an opening for the flow path, wherein the opening has a geometric opening axis along the flow path;

a closure member which is displaceable in a closing direction in a linear manner along a geometric adjustment axis, which extends transversely with respect to the geometric opening axis, in a closure member face from an open position which releases the opening into a closed position pushed linearly over the opening and is displaceable in reverse back in an opening direction;

a first sealing face of the valve housing which surrounds the opening and is at least partially curved; and a second sealing face of the closure member which corresponds with the first sealing face and has a form that corresponds with the first sealing face, wherein:

the first sealing face is assembled from variously formed portions which are in each case non-parallel to the adjustment axis;

surface normals of the portions of the first sealing face have directional components which are in each case parallel to the adjustment axis and consequently the first sealing face points vertically or inclinedly in the opening direction;

a first main portion of the first sealing face extends substantially along a geometric first main face;

a second main portion of the first sealing face extends substantially along a geometric second main face;

the first main face and the second main face extend parallel to the adjustment axis, are spaced apart from one another and extend substantially parallel to the closure member face and consequently the first main portion and the second main portion have, with respect to one another, a geometric offset transversely with respect to the adjustment axis;

the opening is arranged between the first and second main portions;

a lateral first U-shaped side portion of the first sealing face connects the first main portion and the second main portion on one side of the first sealing face;

a lateral second U-shaped side portion of the first sealing face connects the first main portion and the second main portion on another side of the first sealing face;

the lateral first U-shaped side portion and the lateral second U-shaped side portion have in each case a first leg which is associated with the first main portion, a second leg which is associated with the second main portion and a base;

the first leg and the second leg have, with respect to one another, a geometric offset transversely with respect to the adjustment axis;

the base connects in each case the first leg and the second leg and bridges the geometric offset transversely with respect to the adjustment axis;

in the closed position, the second sealing face is in sealing contact, pressing onto the first sealing face in the closing direction, with the first sealing face and the closure member closing the opening in a gastight manner;

the valve housing has a first inclined face which surrounds the opening in the region between the opening and the first sealing face;

the closure member has a second inclined face which extends parallel to the first inclined face, corresponds with the first inclined face and has a form that corresponds to the first inclined face;

the first inclined face and the second inclined face are in each case inclined at an angle of inclination in relation to the closure member face in such a manner that the first inclined face points inclinedly in the opening direction and the first inclined face and the second inclined face are intersected in their geometric extensions by the geometric adjustment axis at the angle of inclination;

the angle of inclination is between 3 and 15 degrees; and the first inclined face and the second inclined face are located with respect to one another in such a manner that, in the closed position of the closure member, the second inclined face is arranged in a parallel position opposite the first inclined face with a spacing between one another in a range from between 0 and 0.6 mm;

wherein:

the first leg of the first lateral U-shaped side portion and the first leg of the second lateral U-shaped side portion extend in each case substantially along first leg planes which are parallel to the adjustment axis;

a first curvature portion of the first sealing face is arranged between the first main portion and the first leg of the first lateral U-shaped side portion and the first leg of the second lateral U-shaped side portion;

the first sealing face which extends along the first main face in the first main portion merges in each case into the first curvature portions, wherein the respective transition from the first main portion into the respective first curvature portion is effected in each case in a geometric first tangential plane to the first main face;

the first leg planes are angled in each case by at least 15 degrees in relation to the respective first tangential plane; and the first sealing face, which extends along the first main face in the first main portion, in the first curvature portion is guided out of the first main face by the at least 15 degrees.

13. The vacuum valve as claimed in claim 12, wherein:

the first main face, the second main face and the closure member face are curved at least in a part portion about a curvature axis that is substantially parallel to the adjustment axis.

14. The vacuum valve as claimed in claim 12, wherein:

the first inclined face comprises an electrically conducting metal face which is coupled with the valve housing with regard to electric potential;

the second inclined face comprises a closed, electrically conducting protective shield which, in the closed position, substantially fully covers the opening and all around the opening is connected electrically to the first inclined face for potential electric coupling of the protective shield with the valve housing; and the spacing in the closed position is equal to 0 for producing the electric contact.

15. The vacuum valve as claimed in claim 12, wherein:

the first inclined face and/or the second inclined face is formed by an additional elastic seal; and the spacing in the closed position of the closure member is equal to 0.

16. The vacuum valve as claimed in claim 15, wherein:

the additional elastic seal is formed by an O-ring which is arranged in a groove.

17. The vacuum valve as claimed in claim 16, wherein:

said O-ring has a circular cross section, a kidney-shaped cross section or an X-shaped cross section.

18. The vacuum valve as claimed in claim 15, wherein:

the additional elastic seal is formed by a seal which is vulcanized on the valve housing and/or on the closure member.

19. The vacuum valve as claimed in claim 12, wherein:

the valve housing and/or the closure member has in the region between the first inclined face and the first sealing face a recess which surrounds the first inclined face and is arranged and developed in such a manner that the spacing between the valve housing and the closure member is at least 0.8 mm in the region of the recess.

20. The vacuum valve as claimed in claim 19, wherein:

the spacing between the valve housing and the closure member is from between 0.8 mm and 6 mm in the region of the recess.

* * * * *